US012722658B2

(12) United States Patent
Kherroubi

(10) Patent No.: US 12,722,658 B2
(45) Date of Patent: Sep. 1, 2026

(54) SYSTEMS AND METHODS FOR ROBUST DECISION-MAKING FOR CONNECTED AND AUTONOMOUS VEHICLE WITH V2X INFORMATION

(71) Applicant: Technology Innovation Institute—Sole Proprietorship LLC, Masdar City (AE)

(72) Inventor: Zine el Abidine Kherroubi, Abu Dhabi (AE)

(73) Assignee: Technology Innovation Institute—Sole Proprietorship LLC, Masdar City (AE)

( * ) Notice: Subject to any disclaimer, the term of this patent is extended or adjusted under 35 U.S.C. 154(b) by 34 days.

(21) Appl. No.: 18/987,394

(22) Filed: Dec. 19, 2024

(65) Prior Publication Data

US 2025/0214622 A1 Jul. 3, 2025

Related U.S. Application Data

(60) Provisional application No. 63/616,899, filed on Jan. 2, 2024.

(51) Int. Cl.
*B60W 60/00* (2020.01)
*B60W 10/04* (2006.01)
(Continued)

(52) U.S. Cl.
CPC ........ *B60W 60/0015* (2020.02); *B60W 10/04* (2013.01); *B60W 10/18* (2013.01);
(Continued)

(58) Field of Classification Search
CPC .. B60W 60/0015; B60W 10/04; B60W 10/18; B60W 10/20; B60W 50/0098;
(Continued)

(56) References Cited

U.S. PATENT DOCUMENTS 10,054,945 B2 8/2018 Zhu et al.
10,296,004 B2 * 5/2019 Nishi .................. B60W 60/001
(Continued)

FOREIGN PATENT DOCUMENTS

CN 115715021 A 2/2023
WO 2022167626 A1 8/2022

OTHER PUBLICATIONS

Agarwal M., et al., "Blind Decision Making: Reinforcement Learning with Delayed Observations," Pattern Recognit. Lett., arXiv:2011.07715v1, Nov. 16, 2020, vol. 150, 15 pages, Retrieved from Internet: URL: https://www.semanticscholar.org/reader/6599196617bf1611b8c69da0ad761553163e3a2b.
(Continued)

*Primary Examiner* — Russell Frejd
*Assistant Examiner* — Brittany Renee Peko
(74) *Attorney, Agent, or Firm* — DLA Piper LLP (US)

(57) ABSTRACT

A system for autonomously controlling a vehicle. The system comprising a receiver configured to receive V2X data, an actuator configured to control an operation of the vehicle, and a processor configured to compensate for impaired observability of the received V2X data by training a reinforcement learning algorithm to update a control policy by adding a random time delay to the received V2X data to produce time delayed V2X data, extracting features from the time delayed V2X data to produce time delayed extracted features, determining, based on the time delayed extracted features and the control policy, an action for controlling the actuator, controlling the actuator based on the determined action, determining a quality metric based on a change in the extracted features due to controlling the actuator based on the determined action, computing a reward based on the quality metric, and updating the control policy based on the reward.

20 Claims, 16 Drawing Sheets

(51) Int. Cl.

| | |
|---|---|
| ***B60W 10/18*** | (2012.01) |
| ***B60W 10/20*** | (2006.01) |
| ***B60W 50/00*** | (2006.01) |

(52) U.S. Cl.

CPC ........ *B60W 10/20* (2013.01); *B60W 50/0098* (2013.01); *B60W 2050/0028* (2013.01); *B60W 2554/4029* (2020.02); *B60W 2554/4041* (2020.02); *B60W 2554/4042* (2020.02); *B60W 2556/45* (2020.02); *B60W 2710/18* (2013.01); *B60W 2710/20* (2013.01); *B60W 2720/106* (2013.01)

(58) Field of Classification Search

CPC . B60W 2050/0028; B60W 2554/4029; B60W 2554/4041; B60W 2554/4042; B60W 2556/45; B60W 2710/18; B60W 2710/20; B60W 2720/106; B60W 60/001; B60W 40/02; B60W 60/0017; B60W 2050/0042; B60W 50/045; B60W 50/085; B60W 2050/046; B60W 2554/00; G06N 3/006; G06N 3/044; G06N 3/0442; G06N 3/045; G06N 3/0464; G06N 3/047; G06N 3/08; G06N 3/084; G06N 3/088; G06N 3/092; G06N 5/01; G06N 7/01; G06N 20/00; G06N 20/10; G08G 1/012; G08G 1/096725; G08G 1/096741; G08G 1/09675; G08G 1/096758; G08G 1/096783; G08G 1/162; G08G 1/163; G08G 1/165; G08G 1/166; G08G 1/167; H04W 4/40

See application file for complete search history.

(56) References Cited

U.S. PATENT DOCUMENTS

| | | | |
|---|---|---|---|
| 11,685,403 | B2 | 6/2023 | Manivasagam et al. |
| 11,760,385 | B2 | 9/2023 | Manivasagam et al. |
| 11,760,386 | B2 | 9/2023 | Manivasagam et al. |
| 12,217,174 | B2 | 2/2025 | Gurumurthy |
| 2018/0143632 | A1 | 5/2018 | Zhu et al. |
| 2021/0146959 | A1 | 5/2021 | Manivasagam et al. |
| 2021/0152996 | A1 | 5/2021 | Manivasagam et al. |
| 2021/0152997 | A1 | 5/2021 | Manivasagam et al. |
| 2022/0053436 | A1* | 2/2022 | Sosnin ................ H04W 56/007 |
| 2023/0121913 | A1 | 4/2023 | Gurumurthy |
| 2023/0138112 | A1 | 5/2023 | Gross et al. |
| 2023/0152796 | A1 | 5/2023 | Zhang et al. |
| 2023/0368584 | A1 | 11/2023 | Jung et al. |
| 2023/0376832 | A1 | 11/2023 | Esna Ashari Esfahani et al. |
| 2024/0086703 | A1 | 3/2024 | Ritter et al. |
| 2024/0323657 | A1* | 9/2024 | Yang ....................... H04W 4/40 |

OTHER PUBLICATIONS

Finkelberg I., et al., "The Effects of Vehicle-to-Infrastructure Communication Reliability on Performance of Signalized Intersection Traffic Control," IEEE Transactions on Intelligent Transportation Systems, Jan. 13, 2021, vol. 23, pp. 15450-15461, Retrieved from Internet: URL: https://www.semanticscholar.org/reader/a3b35e9940df936002106279c825b6e2cf264685.

International Search Report and Written Opinion for Application No. PCT/IB2024/062920, mailed on Mar. 21, 2025, 11 Pages.

Office Action and Search Report for United Arab Emirates Patent Application No. P2024-03609 dated Apr. 5, 2026, 8 pages.

* cited by examiner

810A DETERMINE ACTIONS TO CONTROL ACTUATORS BASED ON STATE FEATURES AND POLICY

810B CHECK/MODIFY THE ACTIONS BASED ON SAFETY PROTOCOL

810C CONTROL THE VEHICLE BASED ON THE CHECKED/MODIFIED ACTIONS

810D COMPUTE A REWARD BASED ON RESULT OF THE ACTION TAKEN

810E UPDATE THE POLICY BASED ON THE REWARD

SYSTEMS AND METHODS FOR ROBUST DECISION-MAKING FOR CONNECTED AND AUTONOMOUS VEHICLE WITH V2X INFORMATION

CROSS-REFERENCE TO RELATED APPLICATIONS

This application claims priority to U.S. Provisional Application No. 63/616,899, filed Jan. 2, 2024, which is incorporated by reference in its entirety.

FIELD

A system and method for robust decision-making for a connected and autonomous vehicle with V2X information.

BACKGROUND

Autonomous vehicles periodically receive vehicle-to-everything (V2X) data (e.g., messages) from other vehicles and infrastructure devices. Conventional autonomous vehicle driving systems use V2X data as input to a decision-making module for controlling the operation of the vehicle. However, impaired observability of the received V2X data results in inaccurate and inefficient control of the vehicle.

SUMMARY

In one aspect, the present disclosure relates to a system for autonomously controlling a vehicle. The system comprising a receiver configured to receive vehicle-to-everything (V2X) data, an actuator configured to control an operation of the vehicle, and a processor. The processor is configured to compensate for impaired observability of the received V2X data by training a reinforcement learning algorithm to update a control policy. The training including adding a random time delay to the received V2X data to produce time delayed V2X data, extracting features from the time delayed V2X data to produce time delayed extracted features, determining, based on the time delayed extracted features and the control policy, an action for controlling the actuator, controlling the actuator based on the determined action, determining a quality metric based on a change in the extracted features due to controlling the actuator based on the determined action, computing a reward based on the quality metric, and updating the control policy based on the reward.

In embodiments of this aspect, the disclosed system according to any one of the above example embodiments, the determined action for controlling the actuator compensates for unobserved changes in a state in the extracted features due to the aperiodicity in the timing of the received V2X data.

In embodiments of this aspect, the disclosed system according to any one of the above example embodiments, the processor is further configured to set statistical parameters of the random time delay according to determined statistical parameters of timing of the received V2X data.

In embodiments of this aspect, the disclosed system according to any one of the above example embodiments, the V2X data comprises at least one of position, speed and direction of another vehicle, a pedestrian or a structure, a traffic light schedule, a traffic condition or a road condition.

In embodiments of this aspect, the disclosed system according to any one of the above example embodiments, the actuator is at least one of a steering actuator, braking actuator or acceleration actuator of the vehicle.

In embodiments of this aspect, the disclosed system according to any one of the above example embodiments, controlling the actuator based on the determined action autonomously controls the vehicle to achieve a driving state relative to a roadway or relative to other vehicles on the roadway.

In embodiments of this aspect, the disclosed system according to any one of the above example embodiments, the processor is further configured to compare the determined action for controlling the actuator to a safety action, and modify the determined action based on the comparison prior to controlling the actuator.

In embodiments of this aspect, the disclosed system according to any one of the above example embodiments, the processor is further configured to extract the features from the received V2X data to produce the extracted features as the V2X data is aperiodically received.

In embodiments of this aspect, the disclosed system according to any one of the above example embodiments, the processor is further configured to perform a combination of Monte Carlo learning and temporal difference learning to compensate for the impaired observability of the received V2X data, wherein during the Monte Carlo learning, the processor approximates the reward.

In embodiments of this aspect, the disclosed system according to any one of the above example embodiments, the processor is further configured to evaluate performance and model drift of the compensating for impaired observability of the received V2X data and perform tuning of hyperparameters of the reinforcement learning algorithm based on the evaluation.

In one aspect, the present disclosure relates to a method for autonomously controlling a vehicle. The method comprising receiving, by a receiver, vehicle-to-everything (V2X) data, controlling, by an actuator, an operation of the vehicle, and compensating, by a processor, for impaired observability of the received V2X data by training a reinforcement learning algorithm to update a control policy. The training comprising adding a random time delay to the received V2X data to produce time delayed V2X data, extracting features from the time delayed V2X data to produce time delayed extracted features, determining, based on the time delayed extracted features and the control policy, an action for controlling the actuator, controlling the actuator based on the determined action, determining a quality metric based on a change in the extracted features due to controlling the actuator based on the determined action, computing a reward based on the quality metric, and updating the control policy based on the reward.

In embodiments of this aspect, the disclosed method according to any one of the above example embodiments, the determined action for controlling the actuator compensates for unobserved changes in a state in the extracted features due to the aperiodicity in the timing of the received V2X data.

In embodiments of this aspect, the disclosed method according to any one of the above example embodiments comprises setting, by the processor, statistical parameters of the random time delay according to determined statistical parameters of timing of the received V2X data.

In embodiments of this aspect, the disclosed method according to any one of the above example embodiments, the V2X data comprises at least one of position, speed and direction of another vehicle, a pedestrian or a structure, a traffic light schedule, a traffic condition or a road condition.

In embodiments of this aspect, the disclosed method according to any one of the above example embodiments, the actuator is at least one of a steering actuator, braking actuator or acceleration actuator of the vehicle.

In embodiments of this aspect, the disclosed method according to any one of the above example embodiments comprises controlling, by the processor, the actuator based on the determined action autonomously to control the vehicle to achieve a driving state relative to a roadway or relative to other vehicles on the roadway.

In embodiments of this aspect, the disclosed method according to any one of the above example embodiments comprises comparing, by the processor, the determined action for controlling the actuator to a safety action, and modifying, by the processor, the determined action based on the comparison prior to controlling the actuator.

In embodiments of this aspect, the disclosed method according to any one of the above example embodiments comprises extracting, by the processor, the features from the received V2X data to produce the extracted features as the V2X data is aperiodically received.

In embodiments of this aspect, the disclosed method according to any one of the above example embodiments comprises performing, by the processor, a combination of Monte Carlo learning and temporal difference learning to compensate for the impaired observability of the received V2X data, wherein during the Monte Carlo learning, the processor approximates the reward.

In embodiments of this aspect, the disclosed method according to any one of the above example embodiments comprises evaluating, by the processor, performance and model drift of the compensating for impaired observability of the received V2X data and performing tuning of hyper-parameters of the reinforcement learning algorithm based on the evaluating.

BRIEF DESCRIPTION OF THE DRAWINGS

So that the way the above-recited features of the present disclosure can be understood in detail, a more particular description of the disclosure, briefly summarized above, may be made by reference to example embodiments, some of which are illustrated in the appended drawings. It is to be noted, however, that the appended drawings illustrate only example embodiments of this disclosure and are therefore not to be considered limiting of its scope, for the disclosure may admit to other equally effective example embodiments.

DETAILED DESCRIPTION

Figure 1:
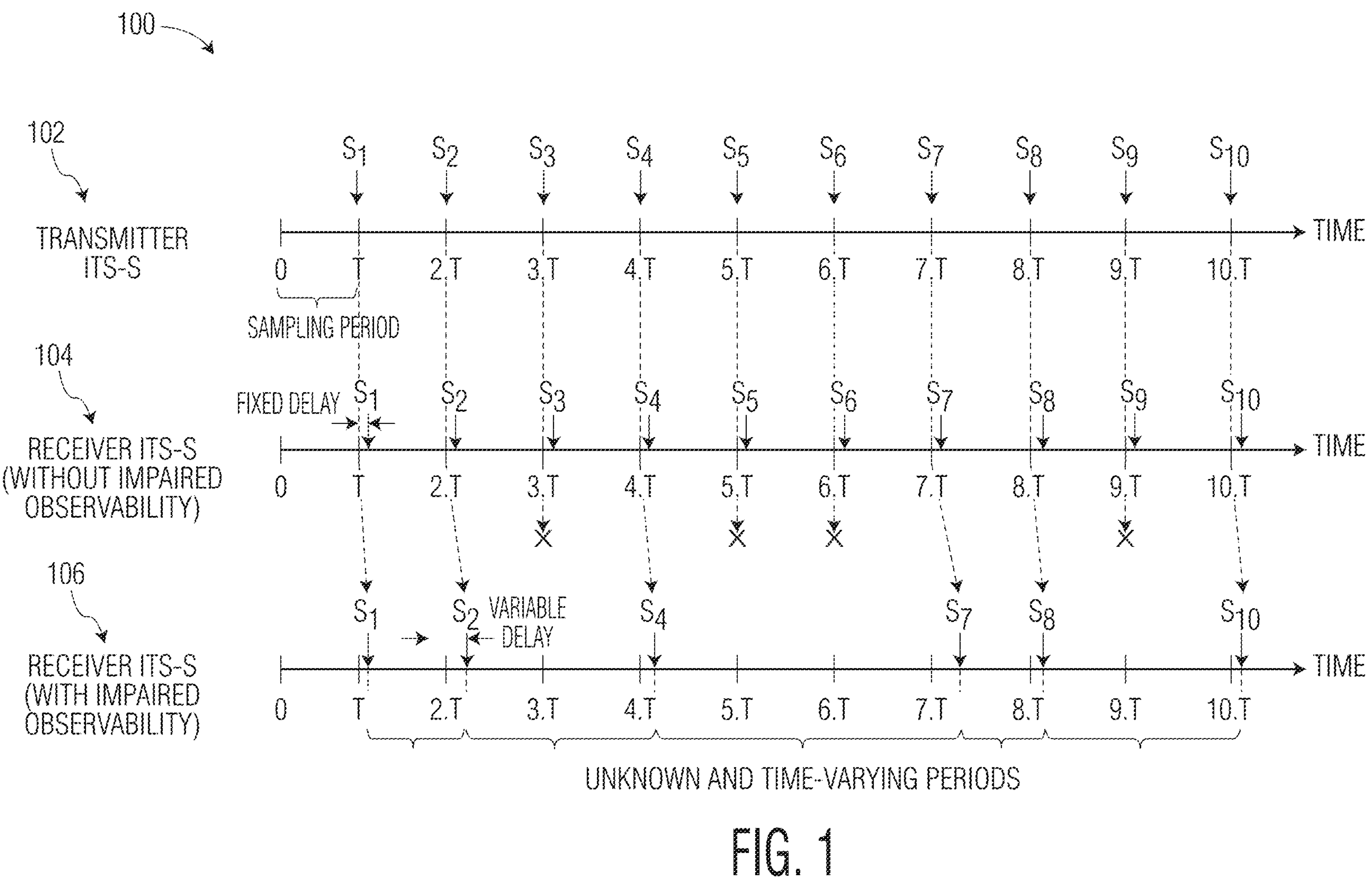
FIG. 1 shows a timing diagram of aperiodicity present in V2X data communication, according to an example embodiment of the present disclosure.

Various example embodiments of the present disclosure will now be described in detail with reference to the drawings. It should be noted that the relative arrangement of the components and steps, the numerical expressions, and the numerical values set forth in these example embodiments do not limit the scope of the present disclosure unless it is specifically stated otherwise. The following description of at least one example embodiment is merely illustrative in nature and is in no way intended to limit the disclosure, its application, or its uses. Techniques, methods, and apparatus as known by one of ordinary skill in the relevant art may not be discussed in detail but are intended to be part of the specification where appropriate. In all the examples illustrated and discussed herein, any specific values should be interpreted to be illustrative and non-limiting. Thus, other example embodiments may have different values. Notice that similar reference numerals and letters refer to similar items in the following figures, and thus once an item is defined in one figure, it is possible that it need not be further discussed for the following figures. Below, the example embodiments will be described with reference to the accompanying figures.

The market for autonomous (e.g., partially or fully autonomous) vehicles is rapidly growing. In operation, autonomous vehicles receive vehicle-to-everything (V2X) data from other vehicles and infrastructure devices. This V2X data may include various information including but not limited to location, direction and speed of other vehicles or pedestrians on the roadway, locations of infrastructure devices, roadway conditions, a traffic light schedule, a traffic condition and the like which may be utilized by the controller of the autonomous vehicles to control their operation thereby achieving safe and efficient operation on busy roadways. Transmission of V2X data (e.g., data frames) occurs periodically. However, reception of the transmitted V2X data may occur aperiodically due to additional delays incurred by the transmitted data due to various factors. These factors may include but are not limited to data processing delay in the intelligent transportation system stations ITS-Ss (e.g., processing delays in the vehicles and infrastructure devices due to sensors data processing, fusion algorithms, etc.), dynamic generation rules of V2X messages (e.g., no fixed frequency, dependence on the traffic dynamics, etc.), and V2X network reliability, (e.g., latency and data loss affected by many factors: type of technology (e.g., dedicated short-range communications (DSRC) vs cellular vehicle to everything (C-V2X) communications), distance between the ITS-Ss, speed of vehicles, traffic density, environment geometry (obstacles, absence of line-of-sight (LOS), etc.), the presence of interference sources, and weather conditions to name a few.

This disclosure is directed to a solution for accounting for (i.e., compensating for) the aperiodicity encountered in the received V2X data such that the autonomous vehicle may be more accurately controlled. In one example, the disclosed methods, devices and systems herein overcome the aperiodicity problem by executing a Blind actor-critic reinforcement learning algorithm that trains a vehicle control policy by way of a combination of temporal difference learning (e.g., modulating the discount factor by actual time delays of the received data) and Monte Carlo learning (e.g., approximating the reward in between V2X data receptions).

In one example, the system calculates salient parameters (i.e., features) that the algorithm uses to define the action of the actuators to drive vehicle autonomously. As an example, possible features may include relative distance of vehicle from surrounding vehicles (such as the leader or the follower vehicle), relative speed of vehicle to surrounding vehicles, lateral distance of vehicle to the lane edges, distance of vehicle to intersection, relative speed of vehicle to the speed limit, etc. The system generally aims to train a Blind Actor-Critic algorithm using data received through the V2X network. During training, the algorithm receives data at random delayed periods (impaired observability) caused by factors in the communication link to the vehicle. In order to ensure that the algorithm behaves accurately, the system (during training) uses a random period generator that receives V2X data and compares the temporal distribution of these samples with a predefined distribution that corresponds to a threshold level of communication link quality that may be supported by the algorithm. If the received data has a temporal distribution corresponding to a communication link that is less than the threshold (i.e., poor quality communication link) then the system trains based on the received data. However, if the received data has a temporal distribution corresponding to a communication link quality that is greater than the threshold (i.e., high quality link), the random period generator adds artificial random time delays to the received data so that the system trains with the V2X data having a temporal distribution that corresponds to the predefined distribution (e.g., lowest level of communication link quality that may be supported by the algorithm). In other words, the system ensures that the training data undergo impaired observability corresponding to a predefined low level of channel quality that may be experienced by the vehicle during operation.

After training, the Blind Actor-Critic algorithm can be tested. During this testing phase (after the algorithm is trained), the received data is provided directly to the algorithm without passing through the random period generator, where an action (control of the vehicle) is determined based on the received data and the trained policy of the Blind Actor-Critic algorithm. The Blind Actor-Critic algorithm is an algorithm based on a fictive factor that forces the algorithm to behave as if the V2X data is received at fixed sampling periods. The details of the Blind Actor-Critic algorithm are described with respect to the figures below.

Benefits of the disclosed methods, devices and systems include but are not limited to increased accuracy of autonomous vehicle control in aperiodic V2X environments. Although the examples described with respect to the figures herein are applicable to control of autonomous automobiles, it is noted that the methods/systems described herein are also applicable to any autonomous vehicle including but not limited to drones, unmanned aerial vehicles (UAVs), missiles, etc. Examples of the solution are described in the figures below.

FIG. 1 shows a timing diagram 100 of aperiodicity in V2X data communication. Prior to describing V2X communication it is noted that V2X communication may be exchanged between autonomous vehicles and other infrastructure devices. In one example, autonomous vehicles may be semi-autonomous where the vehicle automatically controls certain vehicle behaviors, and the driver controls other vehicle behaviors. For example, the driver may drive the vehicle as usual via the steering wheel, brakes and accelerator, while the vehicle may intervene by controlling certain actuators (e.g., steering, acceleration, braking, etc.) as needed depending on the driving situation. In another example, autonomous vehicles may be fully autonomous where the vehicle automatically controls all aspects of driving depending on the driving situation.

V2X communication may include communication between vehicles referred to as vehicle-to-vehicle (V2V) communication, communication between vehicles and infrastructure referred to as vehicle-to-infrastructure (V2I) communication, communication between vehicles and pedestrians referred to as vehicle-to-pedestrian (V2P) communication, and the like. Regardless of the communication partners, some goals of V2X communication include improved navigation, road safety and traffic conditions in autonomous vehicle environments. V2X is facilitated by one or more communication protocols including but not limited to DSRC which may operate in a dedicated band for autonomous vehicle communication and cellular communications such as fifth generation (5G). DSRC may include various dedicated channels within the band including but not limited to control channels for sending basic safety messages, service channels for sending traffic signal, weather and road condition information, public safety channels used by emergency personnel as well as reserved channels.

V2X communication may be facilitated by a V2X transceiver (e.g., DSRC transceiver) located in the autonomous vehicle and infrastructure devices. The V2X transceiver is configured to both transmit and receive signals in the desired frequency bands/channels. Dynamic switching between the channels is also supported by the V2X transceiver to ensure that the data/messages are transmitted over the appropriate frequencies.

V2X communication data is generally transmitted/received in a periodic manner assuming there is no aperiodicity added by the data link. This periodic transmission is shown as transmission plot 102 in FIG. 1 where V2X data is transmitted as $S_1$-$S_{10}$. If the V2X channel operates optimally, then the received V2X data will be received at the receive after a fixed delay from the time of transmission (e.g., $S_1$-$S_{10}$ are received a fixed time after transmission T-10-T) as shown in transmission plot 104. However, due to inconsistencies in processing time of the messages, multipathing in the transmitted radio frequency (RF) signals and other factors, the V2X data may include variable aperiodic delays in reception timing as shown in transmission plot 106 (e.g., $S_1$-$S_{10}$ are delayed or lost different times after their respective transmission times T-10T). In other words, the V2X data is received with impaired observability. This impaired observability may be problematic because the V2X data received after the aperiodic delay may be stale and not accurately reflect the autonomous vehicle environment. In other words, unobserved changes (e.g., changes in vehicle positions, speeds, directions, etc.) may have occurred during the time of the additional delay. If the vehicle controller controls the vehicle based on stale V2X data, inefficient and dangerous maneuvers may be unknowingly performed by the vehicle, especially at high speed. Thus, it may be beneficial to account for the impaired observability of the received V2X data to ensure that the vehicle controller has an accurate understanding of the state of the environment.

Figure 2:
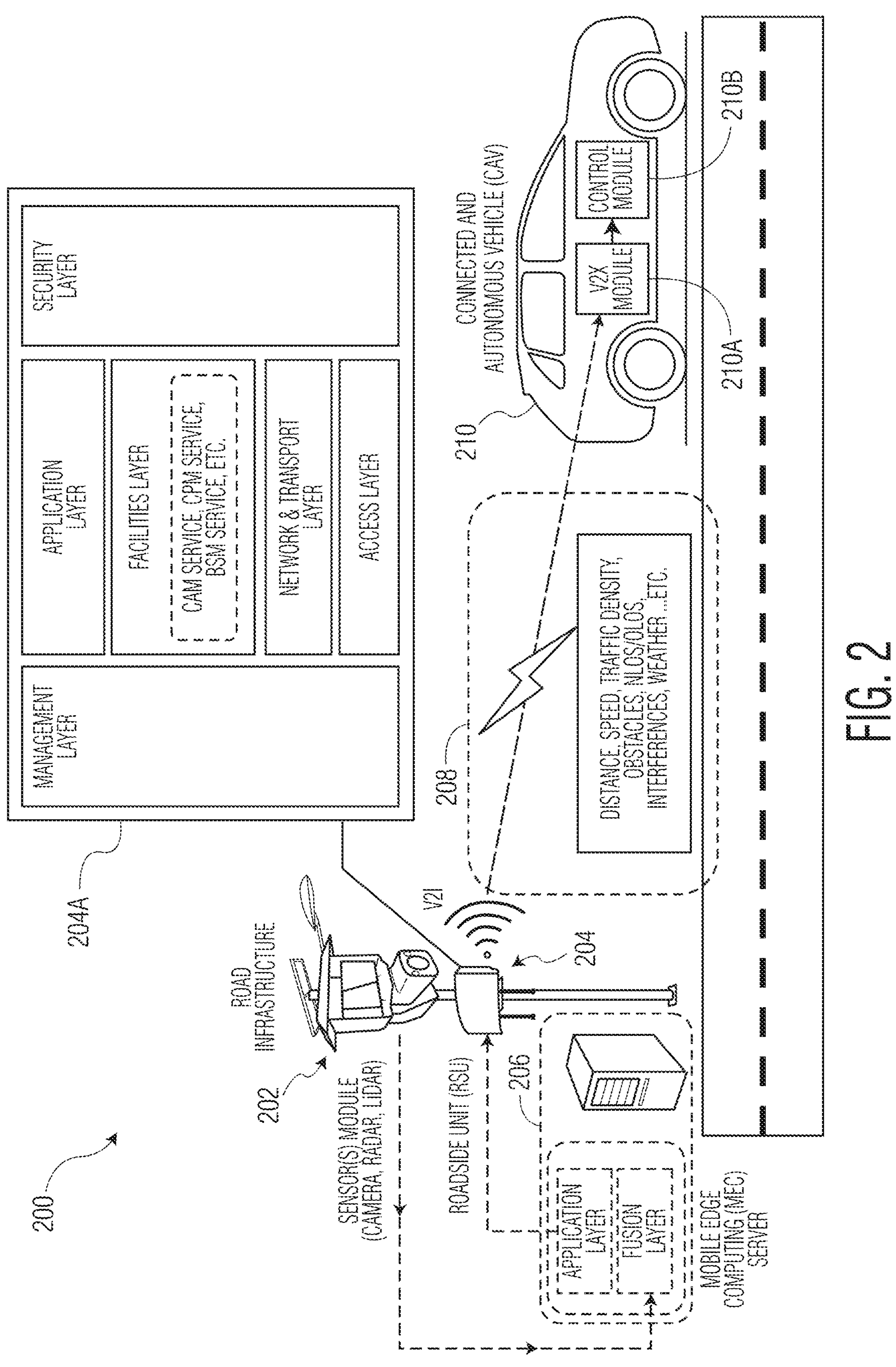
FIG. 2 shows a block diagram of aperiodicity factors in V2I communication, according to an example embodiment of the present disclosure.
Figure 3:
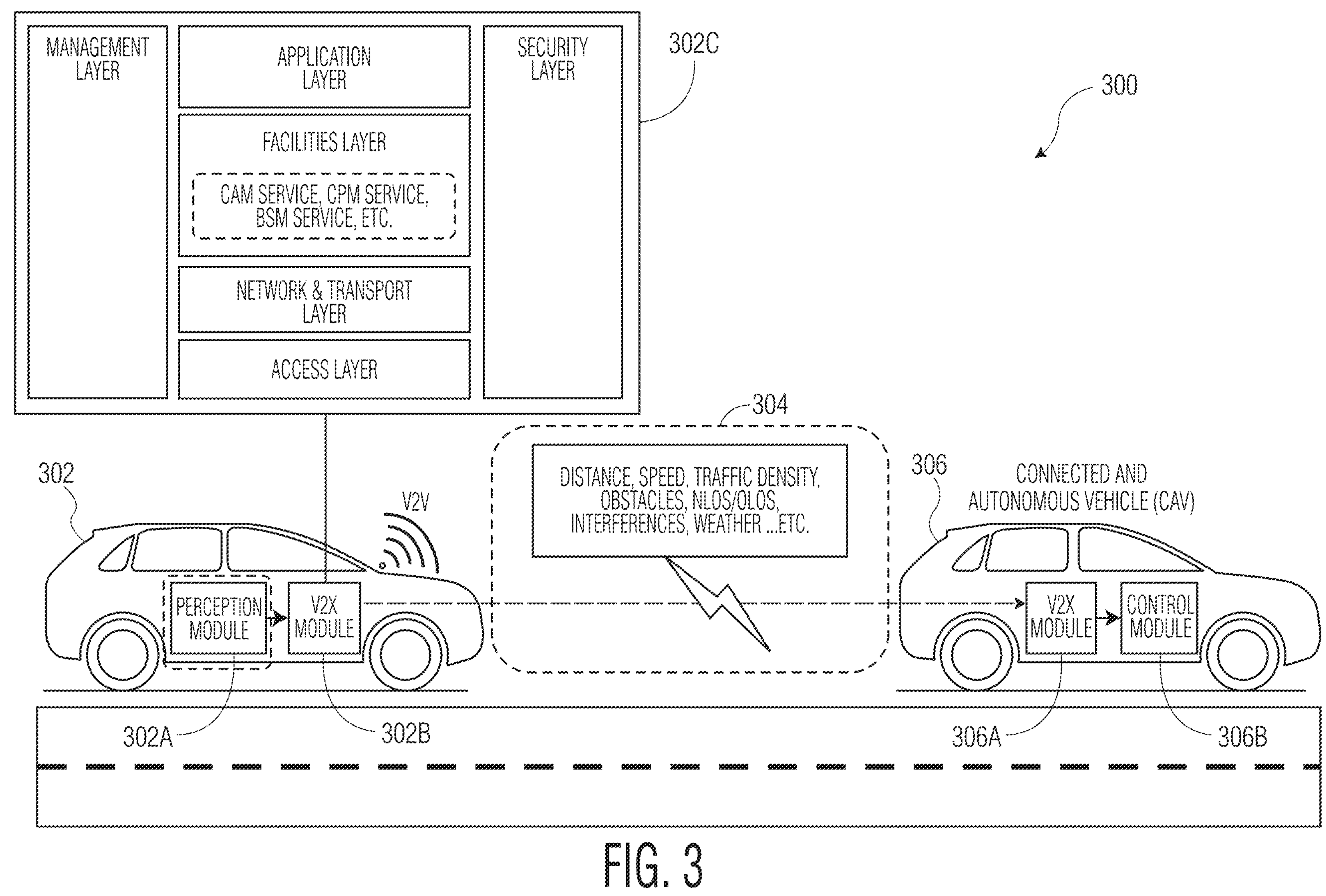
FIG. 3 shows a block diagram of aperiodicity factors in V2V communication, according to an example embodiment of the present disclosure.

Prior to discussing the specific details of the solution for accounting for the impaired observability of the received V2X data, the V2X environment is discussed in more detail. FIGS. 2 and 3 show V2X environments in both V2I and V2V use cases.

FIG. 2 shows a block diagram 200 of impaired observability factors in a V2I use case where an autonomous vehicle 210 communicates with roadway infrastructure device 202. In this example, autonomous vehicle 210 may include a V2X module 210A (e.g., transceiver, etc.) for supporting V2X communication, and a control module 210B for supporting control of the vehicle (i.e., control of the V2X transceiver, actuators, etc.). Roadway infrastructure device 202 may include sensors (e.g., camera, radar, lidar, etc.) and a roadside transceiver unit 204 including hardware/software services 204A (e.g., management layer, security layer, applications layer, network and transport layer, access layer, facilities layer including but not limited to Cooperative Awareness Message (CAM) service, Collective Perception Message (CPM) service, Basic Safety Message (BSM) service, etc.) in communication with a mobile edge computing server or a computer 206.

During operation, autonomous vehicle 210 may be driving down a roadway and monitoring the environment via sensors (not shown). During operation, autonomous vehicle 210 also receives/transmits V2X data to/from roadside transceiver unit 204 via DSRC or some other communication protocol. This V2X data include distance/speed of other vehicles on the roadway, traffic conditions, locations of obstacles as well as other information. For example, autonomous vehicle 210 may use sensors (not shown) to detect its speed/location as well as the location of other vehicles and obstacles on the roadway. Autonomous vehicle 210 may then transmit this V2X data to roadway infrastructure device 202 for processing or distribution to other V2X devices. Processing may be performed by roadway infrastructure device 202 with or without the aid of mobile edge computing server 206. Likewise, roadway infrastructure device 202 may utilize sensors such as cameras, radar, lidar and the like to detect vehicles/obstacles on the roadway, roadway conditions and the like. This information may be processed and sent as V2X data to autonomous vehicle. It is noted that aperiodicity is introduced in the V2X data by various factors including but not limited to delays caused by edge computer 206, hardware/software services 204A of roadside transceiver unit 204, and other factors 208 (e.g., distance, speed, traffic density, obstacles, Non/Occluded-Line-Of-Sight (NLOS/OLOS) conditions, interferences, weather, etc.).

FIG. 3 shows a block diagram 300 of impaired observability factors in a V2V use case where a connected (and possibly autonomous) vehicle 302 communicates with connected and autonomous vehicle 306 operating in a leader/follower configuration (i.e., vehicle 302 is following vehicle 306). In this example, autonomous vehicle 306 may include a V2X module 306A (e.g., transceiver, etc.) for supporting V2X communication, and a control module 306B for supporting control of the vehicle (i.e., control of the V2X transceiver, actuators, etc.). Similarly, connected vehicle 302 may include a V2X module 302B (e.g., transceiver, etc.) including hardware/software services 302C (e.g., management layer, security layer, applications layer, network and transport layer, access layer, facilities layer including but not limited to Cooperative Awareness Message (CAM) service, Collective Perception Message (CPM) service, Basic Safety Message (BSM) service, etc.) for supporting V2X communication, and a perception module 302A for perceiving the environment (i.e., determining information of surrounding vehicles, pedestrians, etc.). It is noted that the autonomous vehicles also have sensors (not shown) for detecting environmental conditions.

During operation, autonomous vehicle 306 is driving down a roadway and monitoring the environment via sensors (not shown), and vehicle 302 is driving down the roadway following vehicle 306. Connected (and autonomous) vehicle 302 receives/transmits V2X data to/from connected and autonomous vehicle 306 via DSRC or some other communication protocol. This V2X data include distance/speed of other vehicles on the roadway, traffic conditions, locations of obstacles as well as other information. For example, connected (and autonomous) vehicle 302 may detect its speed/location as well as the location of other vehicles and obstacles on the roadway. Connected (and autonomous) vehicle 302 may then transmit this V2X data to autonomous vehicle 306 for use by autonomous vehicle 306 or for distribution to other V2X devices. Likewise, autonomous vehicle 306 may utilize sensors to detect vehicles/obstacles on the roadway, roadway conditions and the like. This information may be processed and sent as V2X data to autonomous vehicle 302. In other words, autonomous vehicle 306 and connected (and autonomous) vehicle 302 may detect environmental information and share this environmental information with other vehicles on the roadway. In addition, connected (and autonomous) vehicle 302 and autonomous vehicle 306 may send coordination messages between each other to coordinate operation (e.g., following, accelerating, braking, passing, merging, etc.). It is noted that aperiodicity is introduced in the V2X data by various factors including but not limited to delays caused by perception module 302A, hardware/software services 302C of the V2X transceiver unit 302B, and other factors 304 (e.g., distance, speed, traffic density, obstacles, NLOS/OLOS conditions, interferences, weather, etc.).

Figure 4:
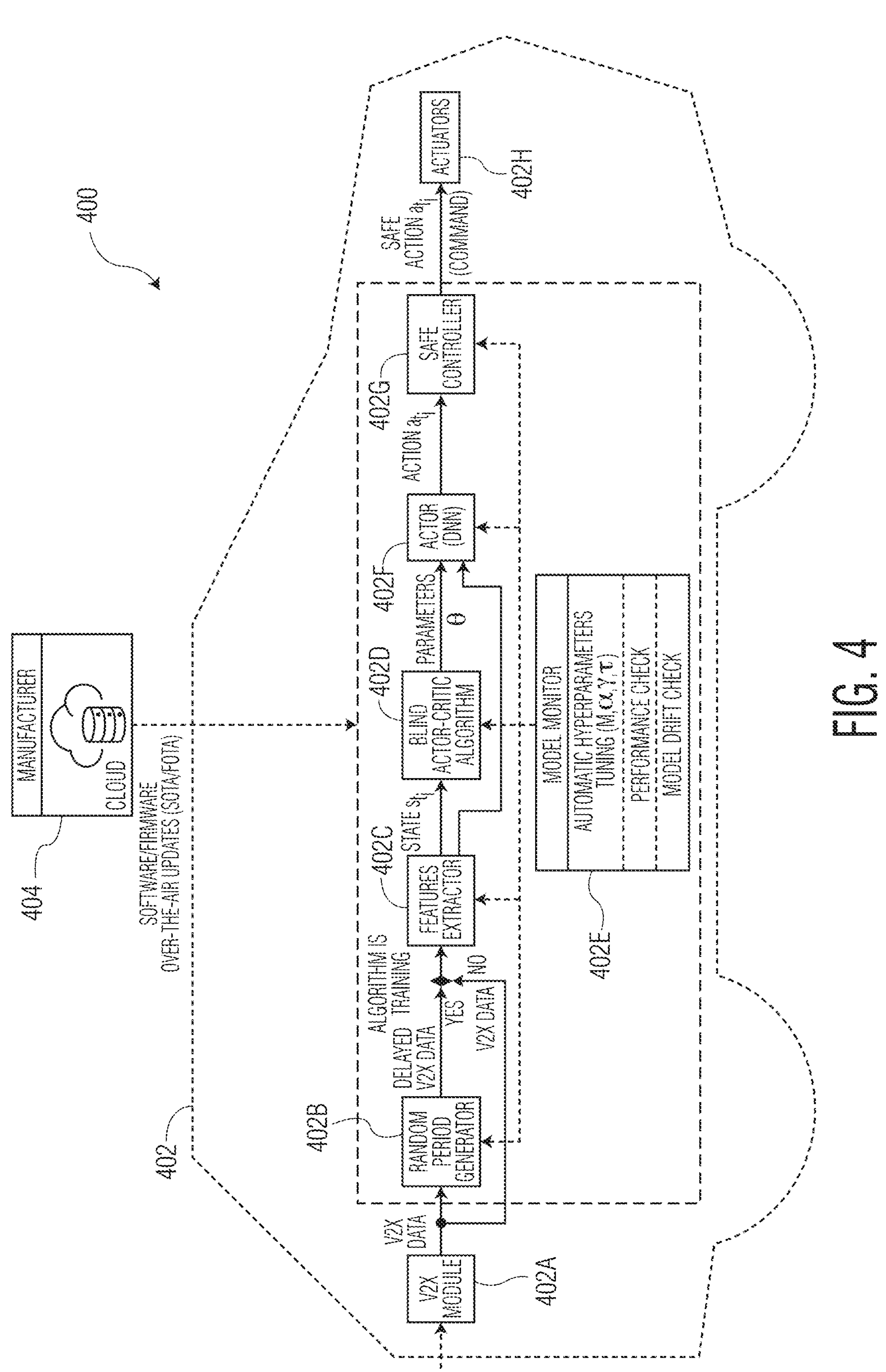
FIG. 4 shows a block diagram of an autonomous vehicle system controlled by a reinforcement learning algorithm, according to an example embodiment of the present disclosure.

FIG. 4 shows a block diagram 400 of an example autonomous vehicle system. Autonomous vehicle 402 generally includes a V2X module 402A (e.g., transceiver, etc.) for supporting transmission/reception of V2X data and messages, random period generator 402B (not present in conventional autonomous vehicles) for adding a random delay period to the received V2X data, features extractor 402C for extracting environmental features from the V2X data, Blind Actor-Critic algorithm module 402D for learning a control policy for the vehicle, actor (i.e., control policy) 402F for calculating and providing action for controlling the vehicle, safe controller 402G for confirming the safety of the actions calculated/provided by actor 402F, and actuator(s) 402H (e.g., steering, braking and acceleration actuators) for executing the actions calculated and provided by actor 402F. Vehicle 402 may also include a model monitor 402E for monitoring and adjusting the model of the Blind Actor-Critic algorithm. Model monitor 402E may perform a performance check, evaluate model drift, perform tuning of hyperparameters, etc. In addition, vehicle 402 may also receive, via V2X module 402A, for example, manufacturer software/firmware updates from manufacturer 404 for controlling operation of one or more of the vehicle modules.

During operation, vehicle 402 may aperiodically receive V2X data from other vehicles and/or infrastructure devices via V2X module 402A. It is noted that vehicle 402 utilizes the received V2X data differently in training and testing phases of the Blind Actor-Critic algorithm. For example, during the training phase of the Blind Actor-Critic algorithm, random period generator 402B may add a random delay to the received V2X data if the actual temporal distribution of the received V2X data does not meet the statistical parameters (e.g., mean, variance, etc.) of the threshold probability distribution. The random delay can be computed and applied based on a predefined distribution that may be based on a threshold (e.g., worst case scenario) communication link quality that can be supported by the algorithm. In other words, during training, random period generator 402B adds a random delay to the received V2X data when necessary to simulate aperiodicity of a specific communication link state (i.e., quality level). Of course, if the communication link is already introducing delays according to the threshold (e.g., worst case scenario) communication link quality, then additional delays do not need to be added by the random period generator (i.e., the data can circumvent the random period generator and proceed to the feature extractor). After the delay is added to the V2X data, features are extracted by features extractor 402C. These features may include but are not limited to relative distance of vehicle from surrounding vehicles (such as the leader or the follower), relative speed of vehicle to surrounding vehicles, lateral distance of vehicle to the lane edges, distance of vehicle to intersection, relative speed of vehicle to the speed limit, etc. These extracted features are input as the current state to Blind Actor-Critic algorithm 402D. The Blind Actor-Critic algorithm 402D performs learning by mapping the states due to the extracted features to policy actions for controlling the vehicle. Once the action is taken, in one example, the next state may be compared to the previous state to determine if an advantage is achieved or not. Depending on the level of advantage achieved (e.g., a quality metric), a reward is computed and then used to adjust the control policy of the Blind Actor-Critic algorithm. The goal is to repeatedly perform updates to the policy to converge on a control policy that achieves a desired goal such as optimally following a vehicle, merging into traffic, changing lanes, etc.). Once trained, the algorithm is tested during a testing phase where the vehicle deploys the resultant policy to control the vehicle in real-world scenarios. It is noted that during the testing phase, random period generator 402B is circumvented such that a random delay period is not added to received V2X data. In other words, adding random delay periods to received V2X data is only performed during training for communication link quality estimation as needed.

Figure 5:
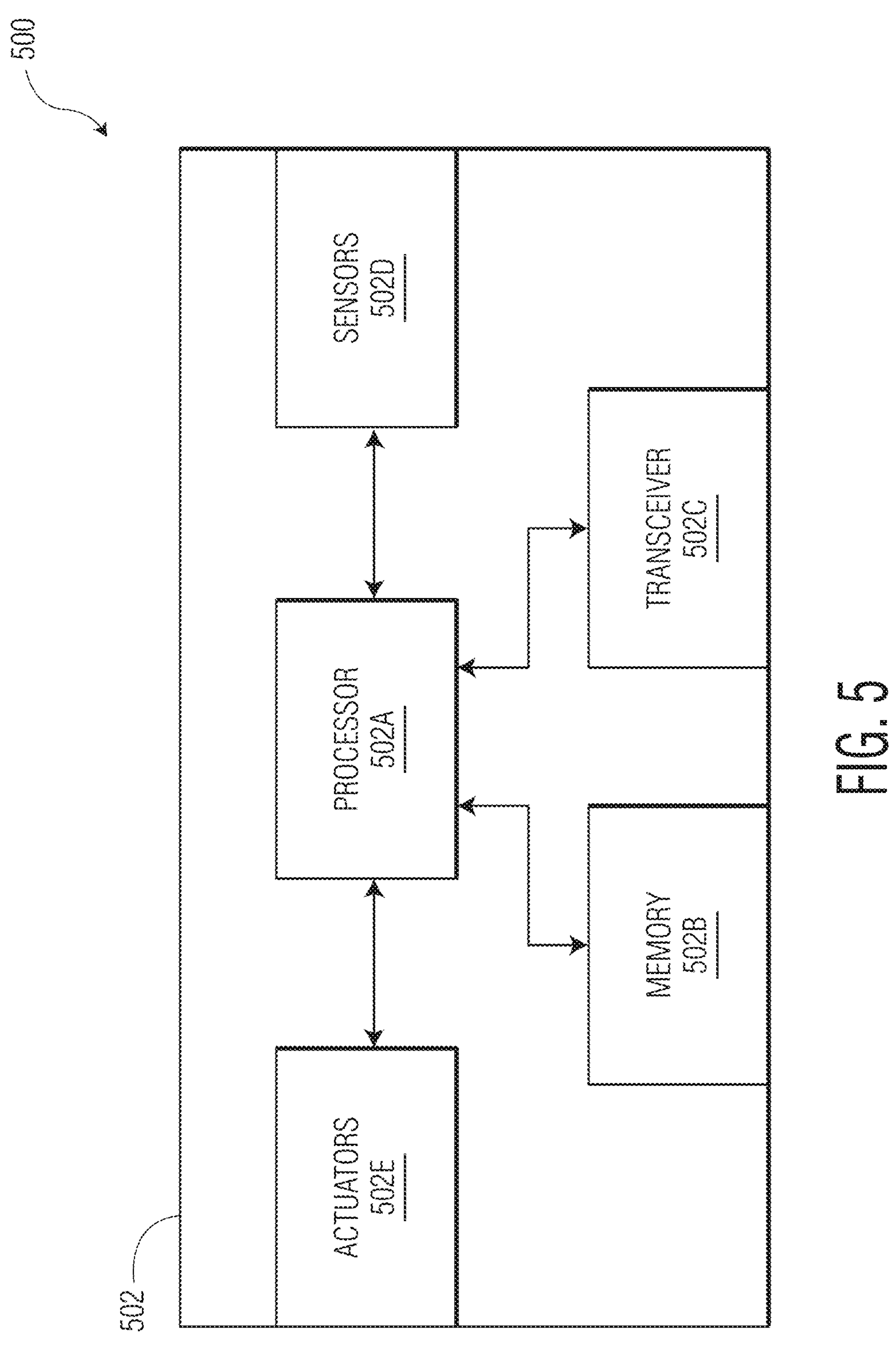
FIG. 5 shows a block diagram of hardware for the autonomous vehicle system, according to an example embodiment of the present disclosure.

FIG. 5 shows a block diagram 500 of hardware for the autonomous vehicle system 502. Although each module in FIG. 4 is shown as being independent, it is noted that each module may be a combination of software and hardware executed on a single processing device or distributed across multiple processing devices within the vehicle. For example, a processor 502A may be a central controller of the vehicle that executes various modules as well as controls various devices within the vehicle. In general, processor 502A may execute software stored in memory 502B to implement random delay generation, feature extraction, Blind Actor-Critic algorithm learning, testing and monitoring and performing the safe control of the vehicle shown in modules 402B, 402C, 402D, 402E, 402F and 402G. In other words, processor 502A of hardware 500 receives information from vehicle sensors 502D and V2X data from transceiver 502C. During the training phase, processor 502A adds the random delay period to the received V2X data if needed, extracts features from the delayed V2X data, trains the Blind Actor-Critic algorithm, determines an action for controlling the actuators, compares the action to a safe control policy and then controls actuators 502E to control the vehicle. Processor 502A may also perform model monitoring to adjust the Blind Actor-Critic algorithm as needed and provide updates to the various modules based on received manufacturing updates.

Figure 6:
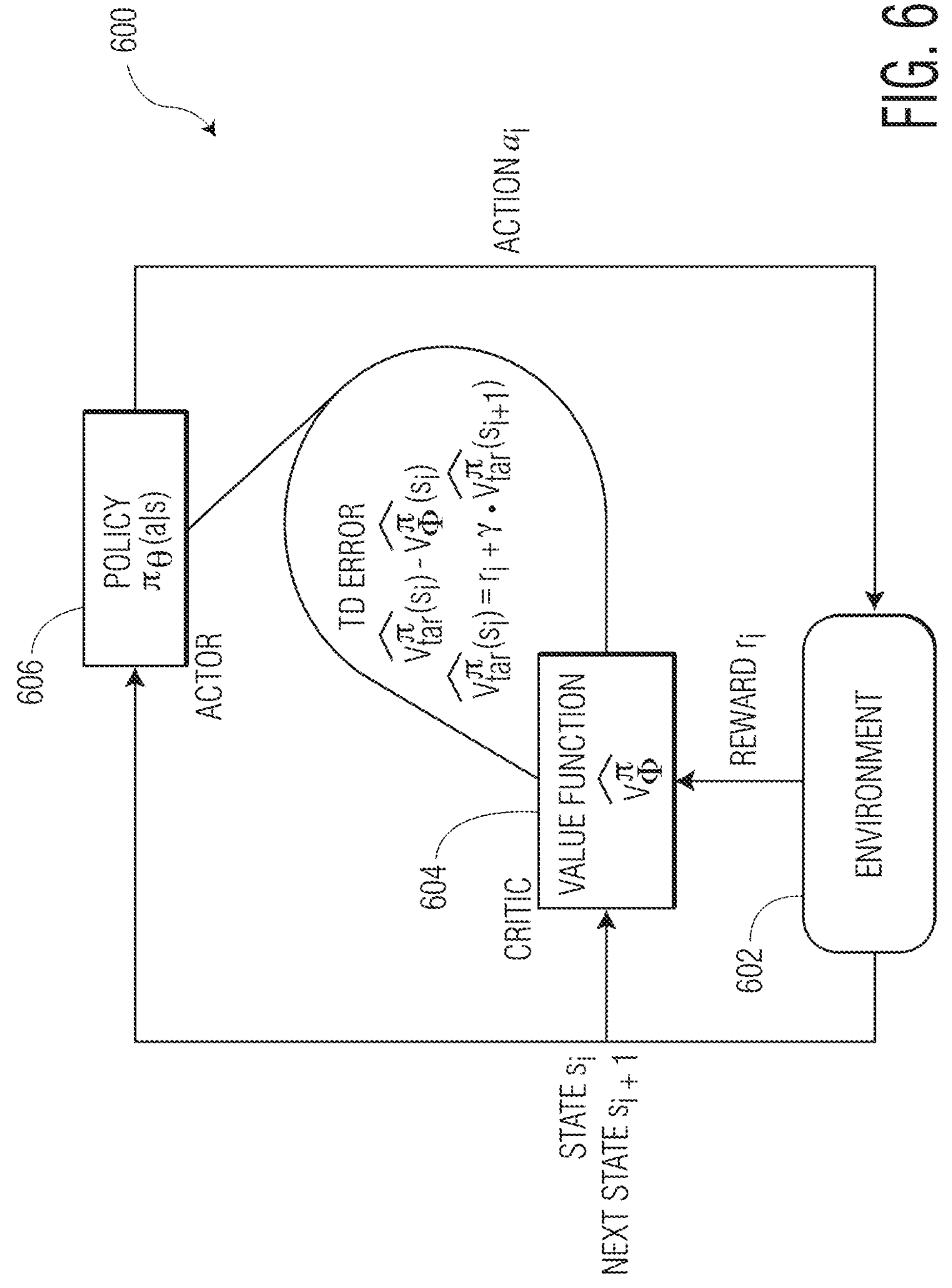
FIG. 6 shows a flowchart of an actor-critic reinforcement learning algorithm according to an example embodiment of the present disclosure.

As mentioned above, the vehicle performs a reinforcement learning algorithm for learning an optimal policy for controlling the vehicle based on a given state of the driving environment (i.e., driving state). In the examples described herein, the reinforcement learning algorithm is the Blind Actor-Critic algorithm also referred to as a Blind Actor-Critic algorithm. FIG. 6 shows a flowchart 600 of an actor-critic reinforcement learning algorithm where the environment is denoted as 602, the critic is denoted as 604 and actor is denoted as 606. During learning, actor 606 executes an action based on a policy for controlling the vehicle and the current state of the environment. After the action is performed, environment 602 state changes and a goal may be achieved. The goal may be merging the vehicle into a traffic lane. If the action contributes positively to achieving the goal (i.e., the vehicle is properly merging into the traffic lane), then a positive reward is computed. If the action contributes negatively to achieving the goal (i.e., the vehicle is improperly merging into the traffic lane), then a negative reward is computed. The reward may be proportional to the amount in which the action contributes to positively or negatively achieving the goal. The reward is used by critic 604 to modify the policy implemented by actor 606 with the goal of maximizing rewards. The adjusted policy is then used to perform an adjusted action on the vehicle to improve control of the vehicle to achieve the goal (i.e., braking, acceleration, steering, etc. are adjusted via respective actuators according to the adjusted policy to better perform merging into the traffic lane).

The next section will discuss details of the basic actor-critic algorithm, and the improved Blind Actor-Critic algorithm. Before delving into the details of these algorithms it may be beneficial to introduce some relevant abbreviations and symbols as shown in Table 1:

TABLE 1

| List of Abbreviations and Symbols | |
|---|---|
| Abbreviation/Symbol | Meaning |
| Actor-Critic Symbols | |
| TD | Temporal-Difference |
| $r_i$ | Reward recieved at the time $t_i$ |
| $s_{t_{i+1}}$ | State at the time $t_{i+1}$ |
| R(s) | Reward function |
| $\gamma$ | Discount factor |
| $V_\phi$ | Value function parameterized by $\phi$ |
| $\hat{V}^{\pi}_{tar}$ | Target value function under policy $\pi$ |
| $\pi_\theta$ | Policy function parameterized by $\theta$ |
| $\delta_i$ | Temporal-Difference error |
| $J(\theta)$ | Objective function of the policy |
| $\hat{A}^{\pi}(s, a)$ | Advantage function under policy $\pi$ |
| Blind Actor-Critic Symbols | |
| $\tau$ | Fictive sampling period |
| $\delta t_i$ | Observation interval at the time $t_i$ |
| $\delta t_{max}$ | Maximum observation interval |
| $max_{steps}$ | Maximum number of approximation steps |
| $\hat{r}_{t_i}$ | Approximate reward of time $t_i$ |
| $f(r_{t_i}, r_{t_{i+1}})$ | Approximation function for rewards |
| $O(k\tau/2)$ | Approximation error term at $k\tau$ |
| $\epsilon_{max}$ | Maximum absolute approximation error |
| $\Delta_{returns}$ | Accumulated approximation errors |
| $\lfloor \cdot \rfloor$ | floor operator (rounding down to the nearest integer) |

In the conventional actor-critic algorithm after each action selection, the critic may evaluate the new state to determine whether that state has improved or deteriorated worse than expected. This evaluation is conveyed through the TD error in Eq. 1 where $V_\Phi$, is the current value function implemented by the critic. This TD error is used to evaluate the action just taken $a_i$ in state $s_i$. If the TD error is positive, it suggests the action tendency to select should be strengthened for the future, whereas if the TD error is negative, it suggests the tendency should be weakened:

$$\delta_i = r_i + \gamma V_\phi(s_{i+1}) - V_\phi(s_i), \tag{1}$$

In contrast, the Blind Actor-Critic method is designed to handle impaired observability, where states and rewards are received at non-periodic intervals. This algorithm builds upon the conventional actor-critic architecture and introduces various improvements including but not limited to: 1) a fictive sampling period $\tau$. This forces the algorithm to assume a virtually fixed observation period of T, even when states and rewards are received at non-periodic intervals (due to delays or losses). This fictive sampling period may be introduced as a new hyperparameter during training; 2) a hybrid learning schema. This combines Temporal-Difference learning when the actual state $s_t$, is received at variable interval $\delta t_i$ with Monte Carlo learning along the temporal path ($t_i$, $t_i+\tau$, $t_i+2\tau$, $t_i$, $+3\tau$, . . . , $t_i+\delta t_{i+1}$) (i.e., when actual state is not available due to impaired observability); and 3) approximating the immediate rewards ($\hat{r}_{t_i}$, $\hat{r}_{t_i+\tau}$, $\hat{r}_{t_i+2\tau}$, $\hat{r}_{t_i+3\tau}$, . . . , $\hat{r}_{t_i+\delta t_i+1}$) along the temporal path ($t_i$, $t_i+\tau$, $t_i+2\tau$, $t_i+3\tau r$, . . . , $t_i+\delta t_{i+1}$) using n order approximation. The value of n depends on the design of the reward function $R(s) \in C^n$.

Figure 7:
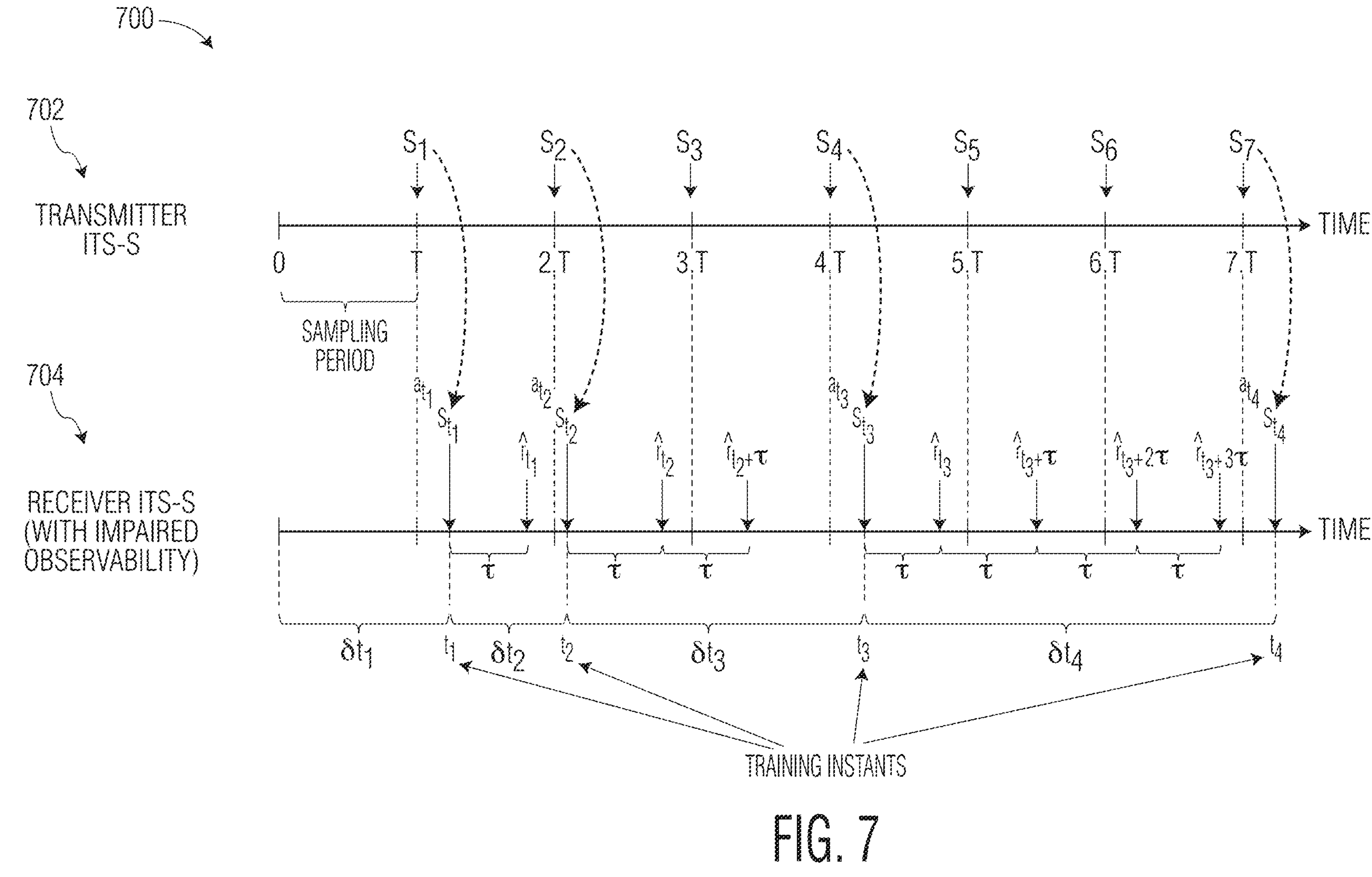
FIG. 7 shows a timing diagram of aperiodicity in V2X data communication with training instants for the Blind actor-critic reinforcement learning algorithm, according to an example embodiment of the present disclosure.

These variables are illustrated in FIG. 7, which shows the fictive sampling period, variable observation intervals, and approximate reward structure. The key concept behind these mechanisms is to force the algorithm to mimic the behavior of a conventional actor-critic agent that receives data (i.e., states and rewards) periodically at a fixed period of $\tau$, i.e., without impaired observability. The algorithm performs Temporal-Difference learning at each time-step it receives new observations.

A concept behind these mechanisms is to force the algorithm to mimic the behavior of a conventional actor-critic agent that receives data (i.e., states and rewards) periodically at a fixed period of $\tau$, i.e., without impaired observability. The algorithm performs Temporal-Difference learning at each time-step it receives new observation ($s_{t_{i+1}}$). For that, TD error is calculated using a target value function $$V^{\pi}_{tar}$$

that is evaluated by Eq. 2, where the discount factor $\gamma$ is further modulated by $$\left(\frac{\delta t_{i+1}}{\tau}\right)$$

to account for the a priori unknown data reception interval $\delta t_{i+1}$.

$$\hat{V}^{\pi}_{tar}(S_{t_i}) = \left[\sum_{k=0}^{\left\lfloor \frac{\delta t_{i+1}}{\tau} \right\rfloor - 1} \gamma^k \cdot \hat{r}_{t_i+k\tau}\right] + \gamma^{\left(\frac{\delta t_{i+1}}{\tau}\right)} \cdot \hat{V}^{\pi}_{tar}(S_{t_{i+1}}) \tag{2}$$

The Blind Actor-Critic compensates for delayed and missing input data (i.e., states and rewards) by using approximate rewards along the temporal path between observations ($t_i$, $t_i+\tau$, $t_i+2\pi$, $t_i+3\tau$, . . . , $t_i+\delta t_i+1$). These approximations allow the estimation of n-step returns with Monte Carlo learning over multiple virtual steps when direct state and reward information is unavailable because of impaired observability. This n-step returns are used to evaluate the target value in Eq. 2, as defined by Eq. 3 where $\lfloor . \rfloor$ denotes floor operator:

$$n\text{-}step \text{ returns} = \left[\sum_{k=0}^{\left\lfloor \frac{\delta t_{i+1}}{\tau} \right\rfloor - 1} \gamma^k \cdot \hat{r}_{t_i+k\tau}\right] \tag{3}$$

Approximations of immediate rewards ($\hat{r}_{t_i+k\tau}$) are performed numerically, so no knowledge of the environment model is required. Given a continuous reward function $R(s) \in C^n$, where ($n \geq 1$), and assuming a limited observation delay $\delta t_{i+1} \leq \delta t_{max}$ (i.e., short term communication distortion), the immediate reward approximation is expressed by Eq. 4 where $r_{t_i+k\tau}$ is the true immediate reward at instant $t_i+k\tau \in [t_i, t_{i+1}]$, $f$ is a predefined approximation function of order n, $r_{t_i}$ and $r_{t_i+1}$ are the received immediate rewards at instants $t_i$ and $t_{i+1}$ respectively, $O(kr/2)$ is the approximation error which has, given the continuity of R(s), the limit of $\delta t_{i+1}$, and the Intermediate Value Theorem, a maximum absolute approximation error $\epsilon_{max}$.

$$\hat{r}_{t_i+k\tau} = f(r_{t_i}, r_{t_{i+1}}) = r_{t_i+k\tau} + O(k\tau/2) \quad (4)$$

$$|O(k\tau/2)| \le \epsilon_{max}; \quad \forall\, k \in \mathbb{N}^* \text{ and } \forall\, t_i \in \mathbb{R}^+ \quad (5)$$

Given equations 3, 4, and 5, the n-step returns can be expressed as Eq. 6 below:

$$n\text{-}step \text{ returns} = \left[\sum_{k=0}^{\left\lfloor \frac{\delta t_{i+1}}{\tau} \right\rfloor - 1} \gamma^k \cdot (r_{t_i+k\tau} + O(k\tau/2))\right] \quad (6)$$

$$n\text{-}step \text{ returns} = \left[\sum_{k=0}^{\left\lfloor \frac{\delta t_{i+1}}{\tau} \right\rfloor - 1} (\gamma^k \cdot r_{t_i+k\tau} + \gamma^k \cdot O(k\tau/2))\right]$$

$$n\text{-}step \text{ returns} = \left[\sum_{k=0}^{\left\lfloor \frac{\delta t_{i+1}}{\tau} \right\rfloor - 1} \gamma^k \cdot r_{t_i+k\tau}\right] + \left[\sum_{k=0}^{\left\lfloor \frac{\delta t_{i+1}}{\tau} \right\rfloor - 1} \gamma^k \cdot O(k\tau/2)\right]$$

To ensure accuracy in the approximations, absolute bound is derived for the accumulated approximation errors$\cdot\Delta_{returns}$• This bound offers a theoretical limit on the cumulative errors for each n-step return, ensuring the robustness of the algorithm. Using equations 5 and 6, accumulated errors can be expressed as shown in Eq. 7 and Eq. 8:

$$\Delta_{returns} = \left[\sum_{k=0}^{\left\lfloor \frac{\delta t_{i+1}}{\tau} \right\rfloor - 1} \gamma^k \cdot O(k\tau/2)\right] \quad (7)$$

$$\Delta_{returns} \le \left[\sum_{k=0}^{\left\lfloor \frac{\delta t_{i+1}}{\tau} \right\rfloor - 1} \gamma^k \cdot \epsilon_{max}\right]$$

$$\Delta_{returns} \le \left[\sum_{k=0}^{\left\lfloor \frac{\delta t_{i+1}}{\tau} \right\rfloor - 1} \gamma^k\right] \cdot \epsilon_{max}$$

$$\Delta_{returns} \le \left[\sum_{k=0}^{\left\lfloor \frac{\delta t_{max}}{\tau} \right\rfloor - 1} \gamma^k\right] \cdot \epsilon_{max}$$

$$\Delta_{returns} \le \left[\sum_{k=0}^{max_{steps}-1} \gamma^k\right] \cdot \epsilon_{max}$$

$$\Delta_{returns} \le \frac{1 - \gamma^{max_{steps}}}{1 - \gamma} \cdot \epsilon_{max}$$

$$\max_{steps} = \left\lfloor \frac{\delta t_{max}}{\tau} \right\rfloor \quad (8)$$

where

Eq. 7 demonstrates that the absolute accumulated n-step returns approximation errors are bounded, given a sufficient accurate approximation function (i.e., $\exists\epsilon_{max} << 1$), which guarantees the stability of the Blind Actor-Critic. This absolute accumulated approximation errors bound varies as function of only $\tau$ and $\gamma$ since $\delta t_{max}$ is a non-controllable parameter that depends on external factors such as communication reliability. Moreover, $\Delta_{\Gamma eturns}$ has the following limits in Eq. 9 given the value of the fictive sampling period $\tau$:

$$\begin{cases} \Delta_{returns} \le \epsilon_{max} & \text{when } \tau = \delta t_{max} \\ \Delta_{returns} \le \dfrac{\epsilon_{max}}{1-\gamma} & \text{when } \tau \approx 0^+ \end{cases} \quad (9)$$

When $\tau=\delta t_{max}$, the accumulated approximation errors bound is minimized. As $\tau$ decreases, the error bound increases, reaching a maximum of $\epsilon_{max}/(1-\gamma)$. However, larger values of $\tau$ (close to $\delta t_{max}$) can cause delayed feedback, leading to suboptimal policies. Therefore, the value of $\tau$ should balance reducing accumulated approximation errors with minimizing delayed feedback. In one example, the maximum bound of $\Delta_{\Gamma eturns}$ as function of $\max_{steps}$ (i.e., $$\left.\frac{\delta t_{max}}{\tau}\right)$$

for different values of $\gamma$ and normalized of $\epsilon_{max}=1$. When $\max_{steps}\in[1,3]$ (i.e., when $3\tau\ge\delta t_{max}$) the maximum bound of $\Delta_{\Gamma eturns}$ increase linearly with $\max_{steps}$ and it is consistent across all values of $\gamma$. When $\max_{steps}>3$ (i.e., when $3\tau\ge\delta t_{max}$), the maximum bound of $\Delta_{returns}$ increases sub-linearly with $\max_{steps}$ and it has different slopes for each value of $\gamma$.

Therefore, a practical trade-off in such an example is to set $\tau=\delta t_{max}/3$ to avoid delayed feedback and to lower accumulated approximation errors. Reversely, when setting a fictive sampling period $\tau$ to 0.4 second for a high-level CAV control, the Blind Actor-Critic is robust up-to 1.2 seconds of impaired observability. While effective and robust, the solution also remains relatively simple, as it adds only one extra hyperparameter ($\tau$) and employs only a few low-order approximations, which require the reward function to be continuous. Moreover, the solution neither models nor estimates the channel state (e.g., V2X communication delays and data loss rates) nor predicts data reception intervals ($\delta t_i$). This simplicity makes the solution method highly practical for real-world applications, where communication parameters-such as channel state, delays, and data loss are often unknown and time-varying factors for the receiving vehicle.

FIG. 7 shows a timing diagram 700 of V2X data with impaired observability, and training instants for the Blind Actor-Critic reinforcement learning algorithm of the present disclosure. As mentioned above, the actor-critic reinforcement learning algorithm is trained by adding aperiodic time delays to the received V2X data when needed. For example, V2X data is transmitted at times T-7T as shown in transmission plot 702. Aperiodic delays are added to the received V2X data as shown in reception data plot 704 at points $S_{t1}$-$S_{t4}$. Each time the V2X data is received with an aperiodic delay represents a possible training instant for the actor-critic reinforcement learning algorithm. As will be described below, training combines both temporal difference learning at points $S_{t1}$-$S_{t4}$ and Monte Carlo learning with approximated rewards at fictive constant sampling period t in between points $S_{t1}$-$S_{t4}$. In other words, the system is training at V2X data reception periods and performing Monte Carlo learning in between reception of aperiodic V2X data. It is noted that rewards approximation for Monte Carlo learning is performed numerically, and therefore no environment model (i.e. no analytical model) is required, which is beneficial for applicability in real-world applications where environment models may not be available.

Figure 8A:
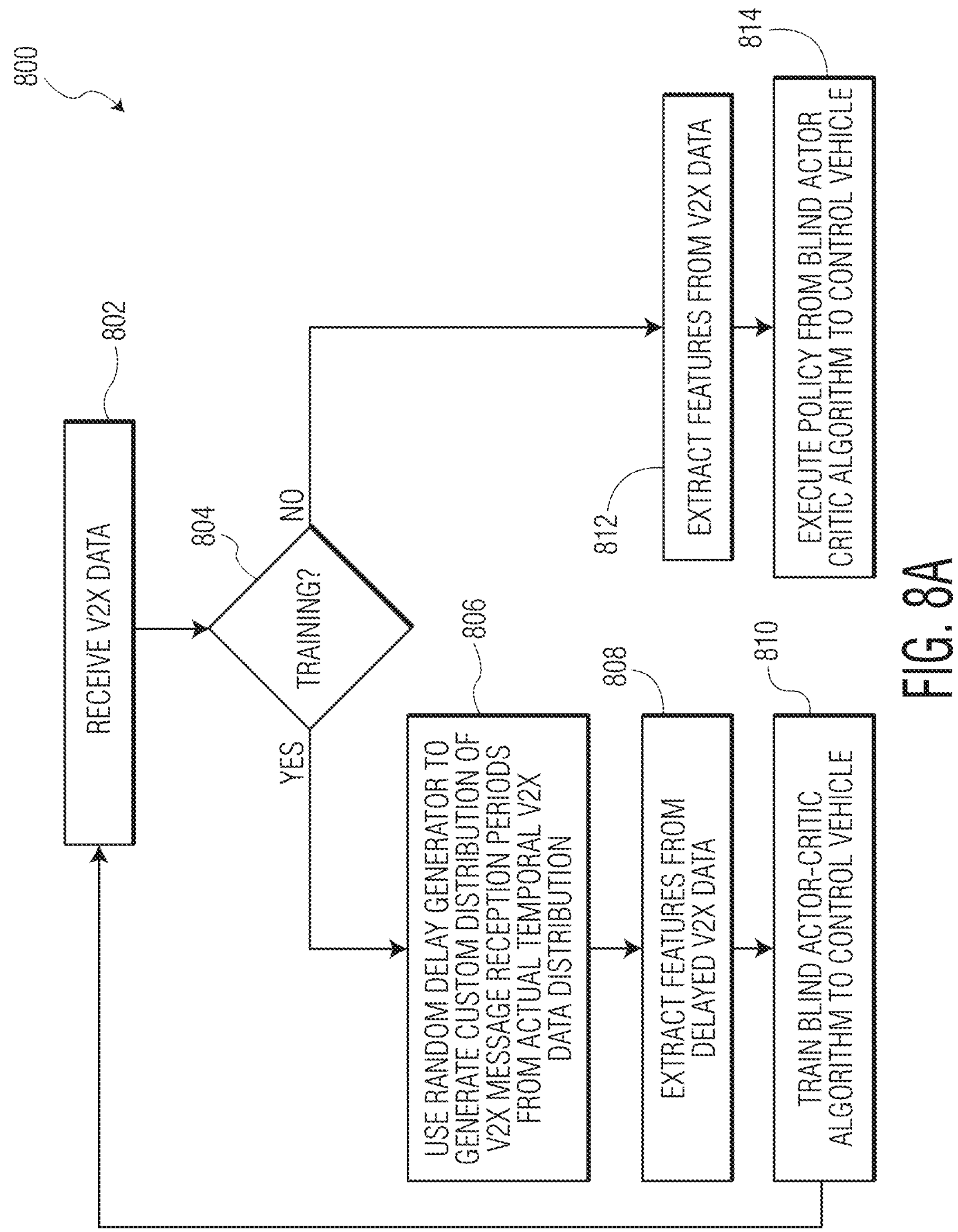
FIG. 8A shows a flowchart of Blind actor-critic reinforcement learning and policy enforcement, according to an example embodiment of the present disclosure.

FIG. 8A shows a flowchart 800 of actor-critic reinforcement learning and policy enforcement. In step 802, the V2X data is received from other vehicles, infrastructure devices, pedestrian devices, etc. In step 804, the vehicle controller determines if the actor-critic reinforcement algorithm training may commence. If training commences, the vehicle controller generates and applies random delays as needed to the received V2X data in step 806 to achieve the threshold level of communication link quality. The vehicle controller then extracts features from the delayed V2X data in step 808 and trains the Blind Actor-Critic algorithm in step 810. Training is repeated as necessary until the Blind Actor-Critic algorithm converges on a model for accurately controlling the vehicle to reach a desired goal (e.g., merging into a traffic lane). As mentioned above, temporal difference learning occurs upon receiving aperiodic data, combined with Monte Carlo learning with approximated rewards at fictive constant sampling period $\tau$ between reception of aperiodic data. For example, every time the vehicle merges into a traffic lane, training is performed to determine an accurate policy for controlling the vehicle state (e.g., braking, acceleration, steering, etc.) to accurately achieve the goal of merging into the lane. Once training is complete, the vehicle controller may then extract features from the V2X data (without the added random delay) in step 812 and execute the trained policy from the Blind Actor-Critic algorithm in step 814 to accurately control the vehicle. In other words, after training is complete, the effectiveness of the model may be tested by controlling the vehicle in various instances based on the policy.

Figure 8B:
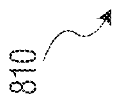
FIG. 8B shows a flowchart of training the Blind actor-critic reinforcement learning, according to an example embodiment of the present disclosure.

FIG. 8B shows a flowchart 810 of details of the training of the actor-critic reinforcement learning algorithm. In step 810A, the controller determines actions to control the actuators of the vehicle according to state values and policy of the algorithm. These actions may include control of steering, braking, acceleration, and other actuators of the vehicle. In an optional step 810B, the controller checks and modifies the actions based on vehicle safety protocol. In other words, the safety controller may have industry standard protocol that ensures that the actions suggested by the Blind Actor-Critic algorithm are not attempting to achieve the goal at the expense of safety. In step 810C, the controller then controls the vehicle actuators based on the checked/modified actions, and then computes a reward based on the result of the action taken and based on reward approximation during Monte Carlo learning in step 810D. The result of the action taken may be quantified by a quality metric indicating how the action taken affected the goal (e.g., safely merge vehicle in traffic, etc.). In step 810E, the controller updates the policy based on the reward and repeats the process until training is complete and the policy converges on an accurate control model for controlling the vehicle in a given scenario. This type of training process may be performed for various vehicle actions such as lane merging, leader/follower scenarios, etc. such that each potential vehicle action has an associated trained model for use in the various scenarios (i.e., model for merging onto highway, model for following other vehicles, model for exiting highway, etc.).

Details of the training of the Blind Actor-Critic algorithm are now further explained. During training, and upon receiving V2X data, a random period generator compares the temporal distribution of received V2X data with a predefined distribution that corresponds to a threshold level of communication link quality that may be supported by the algorithm. If the received V2X data during training has a temporal distribution that corresponds to a higher communication link quality level, the random period generator adds artificial delays to these received data so as to simulate V2X data received with a temporal distribution that corresponds to the predefined distribution (e.g., lowest level of communication link quality that may be supported by the algorithm). In other words, the temporal distribution of received V2X data is purposely degraded by adding additional delays to meet a predefined temporal distribution of a degraded communication link quality. In other words, before the training begins, a reference distribution function $F_{ref}$ of V2X data reception periods is defined to correspond to the lowest level of communication link quality that may be supported by the algorithm. When the algorithm is training, at each timestamp when V2X data is received by the random period generator, the controller calculates the period $\delta t$ from the last timestamp and generates a reference period $\delta t_{ref}$ from the reference distribution function $F_{ref}$. If $\delta t_{ref}-\delta t>=0$ the controller waits a period equal to $\delta t_{ref}-\delta t$ before forwarding the received V2X data from the random period generator to the features extractor.

After the random delay is added to the V2X data, the features extractor can calculate salient parameters (i.e., features) that the algorithm uses to define the action of the actuators to drive vehicle autonomously. Examples of features include, but are not limited to, relative distance of vehicle from surrounding vehicles (such as the leader or the follower), relative speed of vehicle to surrounding vehicles, lateral distance of vehicle to the lane edges, distance of vehicle to intersection, relative speed of vehicle to the speed limit, etc. The features chosen for extraction may be based on the goal of the vehicle (e.g., lane merging, following other vehicles, etc.).

Once feature(s) are extracted, the Blind Actor-Critic algorithm may be trained. The general architecture of a classic actor-critic algorithm is where the actor observes a state $s_i$, performs an action $a_i$ according to the policy $a_i=\pi_\theta(s_i)$. Then, the algorithm observes next state $s_{i+1}$ and reward $r_i$, updates the value function according to the temporal difference error, and updates the policy parameters to maximize the expected rewards. The Blind Actor-Critic algorithm disclosure herein improves on the classic actor-critic algorithm. Specifically, the Blind Actor-Critic algorithm disclosure herein combines both temporal difference learning and Monte Carlo learning to learn the optimal policy.

Training of the Blind Actor-Critic algorithm includes the following algorithmic steps (see numbered step headings and descriptions:

Step 1-----> for episode=1, M do the following:

Detect an episode and begin iterating steps 2-8 of the Blind Actor-Critic algorithm. An episode may be detected when the vehicle succeeds or not at the driving task (completing highway on-ramp merge, changing lane, etc.)

Step 2-----> for instants $t_i=t_1, t_N \in R^*_+$ when V2X data is received from the random period generator, begin iterating steps 3-8 of the Blind Actor-Critic algorithm. These instants are denoted, for example, as instants $t_1, t_2, \ldots t_8$ in FIG. 7.

Step 3--------->if $\delta t_i \geq \tau$:

The algorithm calculates elapsed time $\delta t_i$ (period) between this instant $t_i$ and previous instant $t_{i-1}$. These periods are denoted by $\delta t_1=t_1-t_0$, $\delta t_2=t_2-t_1$, . . . , $\delta t_8=t_8-t_7$ in FIG. 7. This period ($\delta t_i$) is compared to the factor t that represents a "fictive constant sampling period". The training algorithm is executed if $\delta t_i \geq \tau$. When data is sent periodically (without impaired observability) at T sampling period, the present method behaves as classic actor-critic.

Step 4------------------------>1. Take action $a_{t_i} \sim \pi_\theta(a|s_{t_i})$, get next state $s_{t_{i+1}}$ and reward $r_{t_i}=R(s_{t_{i+1}})$ The algorithm takes action $a_{t_i}$ according to the policy $\pi_\theta(a|s_{t_i})$ (the actor) and receives next state $s_{t_{i+1}}$ and reward $r_{t_i}$ that are received at instant $t_{i+1}$ after $\delta t_{i+1}$ time lapse. As an example, and referring to FIG. 7, at instant $t_1$, the algorithm evaluates $\delta t_1$ and execute $a_{t_1}$, and waits to observe $s_{t_2}$ and evaluate $r_{t_1}$ at instant $t_2$, i.e. after $\delta t_2$ period. i.e., the algorithm evaluates the state and takes action at some instant when V2X data is received and waits until the next instant when V2X data is received to evaluate the next state and reward.

Step 5------------------------->2. Update $\widehat{V_\Phi^\pi}$ using target $\widehat{V_{tar}^\pi}$:

$$\widehat{V_{tar}^\pi}(s_{t_i}) = \left[\sum_{k=0}^{int\left(\frac{\delta t_{i+1}}{\tau}\right)-1} \gamma^k \cdot \hat{r}_{t_i+k\cdot\tau}\right] + \gamma^{\left(\frac{\delta t_{i+1}}{\tau}\right)} \cdot \widehat{V_{tar}^\pi}(s_{t_{i+1}})$$

where:

$\delta t_{i+1}$: Time between receiving $s_{t_i}$ and $s_{t_{i+1}}$ ($\delta t_{i+1}$ is not fixed, and does not have a deterministic model) $|\delta t_{i+1} \geq \tau$.

$\hat{r}_{t_i+k\cdot\tau}$: Approximation of reward for instant $t_k = t_i + k\cdot\tau$:

$$\hat{r}_{r_i+k\cdot\tau} \sim f(k, \delta t_{i+1}, R(s_{t_i}), R(s_{t_{i+1}}))$$

f(.): The approximation function which may be of order≥n, depending on the design of the reward function $R(S)\in C^n$. As an example, but not limited to, when n=1 ($R(s)\in c^1$), function f(.) could be:

$$f(k, \delta t_{i+1}, R(s_{t_i}), R(s_{t_{i+1}})) = R(s_{t_i}) + (k+1)\cdot\tau\cdot(R(s_{t_{i+1}}) - R(s_{t_i}))/\delta t_{i+1}$$

Since the approach uses a fictive factor t as a sampling period, the target value of critic $\widehat{V_{tar}^\pi}$ may be:

$$\widehat{V_{tar}^\pi}(s_{t_i}) = r_{t_i} + \gamma \widehat{V_{tar}^\pi}(s_{t_i+\tau}) \quad (*)$$

Because of impaired observability (delays and data loss), $s_{t_{i+1}}$ may be received after an unpredicted period $\delta_{t_{i+1}} = t_{i+1} - t_i$. Hence, equation (*) may not be valid and cannot be applied recursively at $\{t_i+\tau, t_i+2\cdot\tau, t_i+3\cdot\tau, \ldots, t_{i+1}\}$ because the ground truth information about states and rewards at these instants are not available. Instead, the algorithm updates the target value $\widehat{V_{tar}^\pi}(s_{t_i})$ along the path $\{t_i+\tau, t_i+2\cdot\tau, t_i+3\cdot\tau, \ldots, t_{i+1}\}$ (i.e. when information is not available) using Monte Carlo learning with approximative rewards:

$$\text{Monte Carlo update} = \hat{r}_{t_i} + \gamma^1 \hat{r}_{t_i+\tau} + \gamma^2 \hat{r}_{t_i+2\cdot\tau} + \ldots + \gamma^{n-1} \hat{r}_{t_i+(n-1)\cdot\tau} \quad (**)$$

Where:

$$n = \text{int}\left(\frac{\delta t_{i+1}}{\tau}\right)$$

$\{\hat{r}_{t_i+k\tau} : k\in[0, n-1]\}$ is approximation of the reward R(s), using $r_{t_{i-1}} = R(s_{t_i})$ and $r_{t_i} = R(s_{t_{i+1}})$, which are a known values. The approximation method and order are determined from the form of R(s) (the function form is known). For example, a linear first order approximation (Euler method) or the like may be used.

Since $s_{t_{i+1}}$ is available at $t_{i+1}$, $\widehat{V_{tar}^\pi}(s_{t_{i+1}})$ can be evaluated and used for temporal difference (TD) update (i.e., Bootstrapping):

$$TD \text{ update} = \gamma^{\left(\frac{\delta t_{i+1}}{\tau}\right)} \cdot \widehat{V_{tar}^\pi}(s_{t_{i+1}}) \quad (***)$$

In (***), the classic discount factor $\gamma$ is modulated by $$\frac{\delta t_{i+1}}{\tau}$$

to account for temporal lapse $\delta t_{i+1} = t_{i+1} - t_i$ between $t_{i+1}$ and $t_i$ (i.e., delay in V2X data).

So, the update of the target $\widehat{V_{tar}^\pi}(s_{t_i})$ is the sum of () and (*) which can be expressed in compact form as:

$$\widehat{V_{tar}^\pi}(s_{t_i}) = \left[\sum_{k=0}^{int\left(\frac{\delta t_{i+1}}{\tau}\right)-1} \gamma^k \cdot \hat{r}_{t_i+k\cdot\tau}\right] + \gamma^{\left(\frac{\delta t_{i+1}}{\tau}\right)} \cdot \widehat{V_{tar}^\pi}(s_{t_{i+1}})$$

As an example, and referring to FIG. 7, to update $\widehat{V_{tar}^\pi}(s_{t_3})$, the algorithm receives next state $s_{t_4}$ and reward $r_{t_3}$ at instant $t_4$. Since $$\delta t_4 \approx 4.5\tau,\ n = \text{int}\left(\frac{\delta t_4}{\tau}\right) = 4,$$

hence:

Monte Carlo update at instant $t_4 = \hat{r}_{t_3} + \gamma \hat{r}_{t_3+\tau} + \gamma^2 \hat{r}_{t_3+2\cdot\tau} + \gamma^3 \hat{r}_{t_3+3\tau}$ Where: $\hat{r}_{t_3}, \hat{r}_{t_3+\tau}, \hat{r}_{t_3+2\cdot\tau}, \hat{r}_{t_3+3\tau}$ are approximations that are calculated using $r_{t_2} = R(s_{t_3})$ and $r_{t_3} = R(s_{t_4})$ TD update at instant $$t_4 = \gamma^{\left(\frac{\delta t_4}{\tau}\right)} \cdot \widehat{V_{tar}^\pi}(s_{t_4})$$

and $\widehat{V_{tar}^\pi}$ tar $(s_{t_3})$ update is:

$$\widehat{V_{tar}^\pi}(s_{t_3}) = \hat{r}_{t_3} + \gamma \hat{r}_{t_3+\tau} + \gamma^2 \hat{r}_{t_3+2\tau} + \gamma^3 \hat{r}_{t_3+3\tau} + \gamma^{\left(\frac{\delta t_4}{\tau}\right)} \cdot \widehat{V_{tar}^\pi}(s_{t_4})$$

$$> 3 \cdot \text{Evaluate } \widehat{A^\pi}(s_{t_i}, a_{t_i}) = \widehat{V_{tar}^\pi}(s_{t_i}, a_{t_i}) - \widehat{V_\Phi^\pi}(s_{t_i}, a_{t_i}) \quad \text{Step 6}$$

The algorithm evaluates the advantage function (or TD error) as in the classic actor critic method.

$$> 4 \cdot \nabla_\theta J(\theta) \approx \nabla_\theta \log\pi_\theta(a \mid s)\hat{A}^{\pi}(s, a) \quad \text{Step 7}$$

The algorithm evaluates the Policy Gradient.

$$> 5 \cdot \theta \leftarrow \theta + a\nabla_\theta J(\theta) \quad \text{Step 8}$$

The algorithm updates the Policy Parameters.

After training is complete, testing of the trained policy is performed in similar driving scenarios (e.g., merging, following, etc.). Testing generally includes the following steps:

for $t_i = t_1$, $t_N \in R^*+$ when V2X data is received from the V2X communication module do:

if $\delta t_i \geq \tau$

1. Take action $a_{t_i} \sim \pi_\theta(a|s_{t_i})$
2. Evaluate action $a_{t_i}$ by the safe controller and replace it by nearest safe action $$a_i^{safe}$$

Note: This step is optional and may be included in the training phase if it is used in testing or vice versa.

3. Execute the safe action $$a_i^{safe}$$

by the actuator (acceleration steering, etc.).

Note: This step is also included in the training phase.

The disclosed Blind Actor-Critic algorithm has been simulated to outperform the classic actor-critic algorithm. Comparisons of the performance between the disclosed Blind Actor-Critic algorithm and the classic actor-critic algorithm are shown in FIGS. 9A-9D. It is noted that the simulation framework and resulting simulation results are just one example of how to simulate and benchmark the Blind Actor-Critic algorithm with respect to the state of the art. These simulations are not limiting and could be performed using other frameworks and methods.

The simulation framework comprises a traffic simulator environment SUMO (Simulation of Urban Mobility), a V2X interface to simulate V2X data delays and loss, and a module that incorporates the algorithm. The traffic simulator controls the traffic and motion of vehicles and provide their states to the V2X interface through TraCI, which is an API that provides access to a SUMO traffic simulation. The V2X interface considers both V2X delays and data loss. When a delay occurs, the vehicle observes a past state of the environment, while in case of data loss, the observation is completely missed. The V2X interface simulates communication delays using a probabilistic distribution and generates data loss based on a specified probability PMLR. Since estimating an accurate model for V2X communication delays is not feasible in practice because the external factors and application scenarios differ, various models were reported in the literature with different Probability Density Function (PDF). For consistency, the Normal distribution, $\mu_{delay}\sigma_{delay}$, was used for modeling delays, and the Bernoulli distribution, Bernoulli($P_{MLR}$), for the data loss probability. The values of these functions' parameters are selected uniformly within their specific ranges, as reported in the literature, and as summarized in Table II:

TABLE II

V2X parametric functions parameters' values.

| Parameter | Range |
|---|---|
| $\mu_{delay}$: mean of V2X delays | [10 ms, 30 ms, 50 ms, 70 ms, 90 ms] |
| $\sigma_{delay}$: standard deviation of V2X delays | 23 ms |
| $P_{MLR}$: V2X Messages Loss Rate | [0.1, 0.3, 0.5, 0.7, 0.9] |
| Maximum time interval for receiving at least a V2X data | 1200 ms |

Furthermore, since the scope focuses on short-term communication distortions rather than complete failures in the network, it was assumed that at least one V2X data is received within a maximum interval of 1200 ms, even under the highest levels of delay and data loss, as shown in Table II. The algorithm module receives input data from the V2X interface and performs training and testing using PyTorch library. It then provides actions to control CAV through the same interface TraCI. To evaluate the approach, the Blind Actor-Critic algorithm was trained and tested to perform high-speed highway on-ramp merging under the simulation framework. The motivations for using this use case are: First, highway-on ramp merging involves several complex tasks such as searching and finding appropriate gap, adjusting speed, and interacting with surrounding vehicles. This complexity enables a more faithful evaluation of the present approach compared to simpler use cases; Second, highway on-ramp locations are critical zones for traffic safety. According to recent report by the National Highway Traffic Safety Administration, nearly 30,000 highway merging collisions occur each year in the USA, which represents 0.3% of all collisions; and Third, highway on-ramp locations are critical zones for traffic efficiency. Indeed, recurring bottlenecks cause 40% of traffic congestion on the U.S. highway system, with highway on-ramps being significant contributors.

This use case provides a rigorous test of the algorithm's ability to handle complex traffic interactions under real-world conditions. Under the simulation framework, a real-world highway on-ramp scenario is replicated, located on a segment of interstate 80 in Emeryville (San Francisco), California, where the traffic flow is extracted from NGSIM database. Simulation parameters are summarized in Table III:

TABLE III

Parameters values [26].

| Parameter | Value |
|---|---|
| Main lane speed limit ($\upsilon_{limit}$) | 33 m/s |
| Main lane speed range | [22 m/s, 34 m/s] |
| Main lane traffic flow | N(μ, σ)<br>μ = 1 vehicle per 3.25 seconds<br>σ = 0.1 |

TABLE III-continued

| Parameters values [26]. | |
|---|---|
| Parameter | Value |
| Main lane acceleration range | [−5 m/s$^2$, +3 m/s$^2$] |
| Main lane driver's cooperation level (C) | C ∈ [$C_{min}$: 1]<br>C = 1: most cooperative driver<br>C = $C_{min}$: least cooperative driver |

Using this simulation setup, the Blind Actor-Critic algorithm is trained and tested where the state ($s_{t_i}$), action ($a_{t_i}$), and reward ($r_{t_i}$) are defined as follows: State (k) is defined as a vector: $st_i$=<$d_{cav}$, $v_{cav}$, $d_{P_1}$, $d_{F_1}$, $v_{F_1}$, $d_{p_2}$, $d_{F_2}$, $v_{F_2}$> where $d_{cav}$ (resp. $v_{cav}$) is the distance to the merging point (resp. speed) of CAV, while $d_{K_i}$ (resp. $v_{K_i}$) is the relative distance (resp. speed) between vehicle $K_i$ and CAV. This vector comprises only the most significant features. Action ($a_{t_i}$) is the longitudinal acceleration or deceleration of CAV. Reward ($r_{t_i}$) is defined to balance both safety and performance as in Eq. 10:

$$r_{t_i} = \begin{cases} -\alpha \cdot \left| e^{-\left(\frac{d_{P_1}}{100}\right)} - e^{-\left(\frac{d_{F_1}}{100}\right)} \right| & (*) \\ +1 & () \\ -1 & (*) \end{cases} \tag{10}$$

where: (*) is a term that aims to maximize safety distance with the preceding and following vehicles when CAV is in the merge zone and is a hyper-parameter tuned during training; () is a term that rewards the successful completion of merging; and (*) is a term that penalizes collisions or stops.

The Blind Actor-Critic is trained and tested to perform highway on-ramp merging under the simulation framework. The performances are compared to benchmark algorithms to validate the approach. Training is conducted with automatic hyper-parameter tuning to ensure consistency and fairness across all approaches. For time and cost effectiveness, only the following hyper-parameters were automatically tuned: the reward factor α, the number of training steps, and the fictive factor r. The fixed hyper-parameters values are summarized in Table IV:

TABLE IV

| Hyper-parameters values | |
|---|---|
| Hyper-parameter | Value |
| Reward discount factor | 0.98 |
| Actor learning rate | 0.0001 |
| Critic learning rate | 0.001 |
| Target network update coefficient | 0.001 |
| Experience replay memory size | 400000 |
| Mini-batch size | 64 |
| Ornstein-Uhlenbeck σ | 0.4 |
| Ornstein-Uhlenbeck Θ | 0.2 |

The remaining figures evaluate the performance of the Blind Actor-Critic algorithm. One benchmark to evaluate the performance is training efficiency. Two metrics are used to compare the training efficiency: the residual variance of the value function and the average normalized training rewards including: 1) Evaluation of Residual Variance of the Value Function: The residual variance of the value function is defined by Eq. 11:

$$\text{Residual variance} = \frac{\mathrm{Var}\left(\hat{V}^{\pi}_{tar} - \hat{V}^{\pi}_{\phi}\right)}{\mathrm{Var}\left(\hat{V}^{\pi}_{tar}\right)}, \tag{11}$$

Var(.) denotes the variance. Residual variance measures how well the trained critic network $$\hat{V}^{\pi}_{\phi}$$

matches the empirical target critic $$\hat{V}^{\pi}_{tar}$$

Figure 9A:
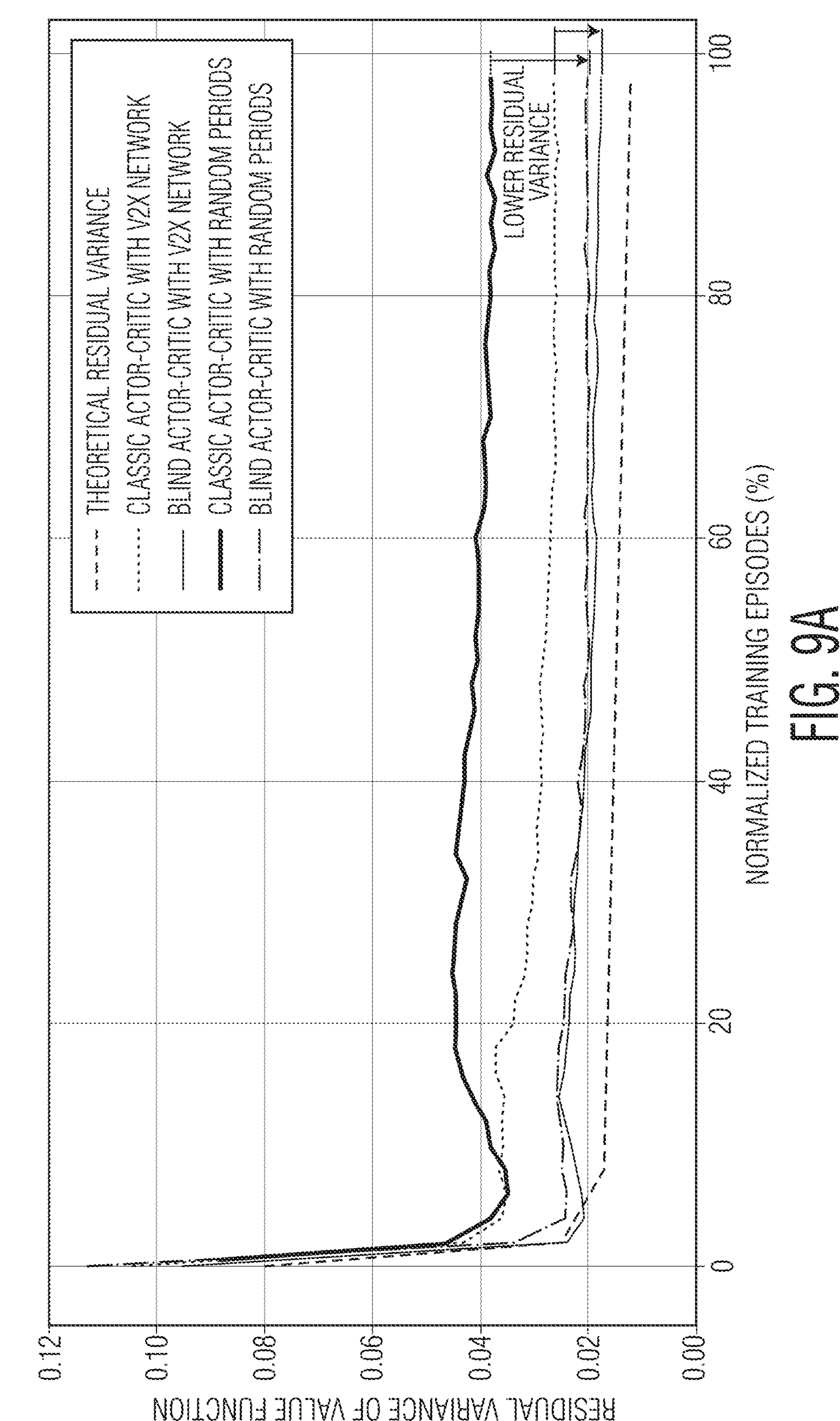
FIG. 9A shows a data plot of average residual variance of the critic network, according to an example embodiment of the present disclosure.

High residual variance at the end of training indicates that V' fails to fit the true values of $V^{\pi}$ (i.e. fails to optimize the objective rewards). This can negatively impact the learning and performance of the actor $\pi_\theta$. FIG. 9A shows a data plot 900 of average residual variance of the critic network with respect to a percentage of normalized training episodes. As shown, the Blind Actor-Critic algorithm with both simulated V2X network and random delays periods have lower residual variance than the classic actor-critic algorithm.

Figure 9B:
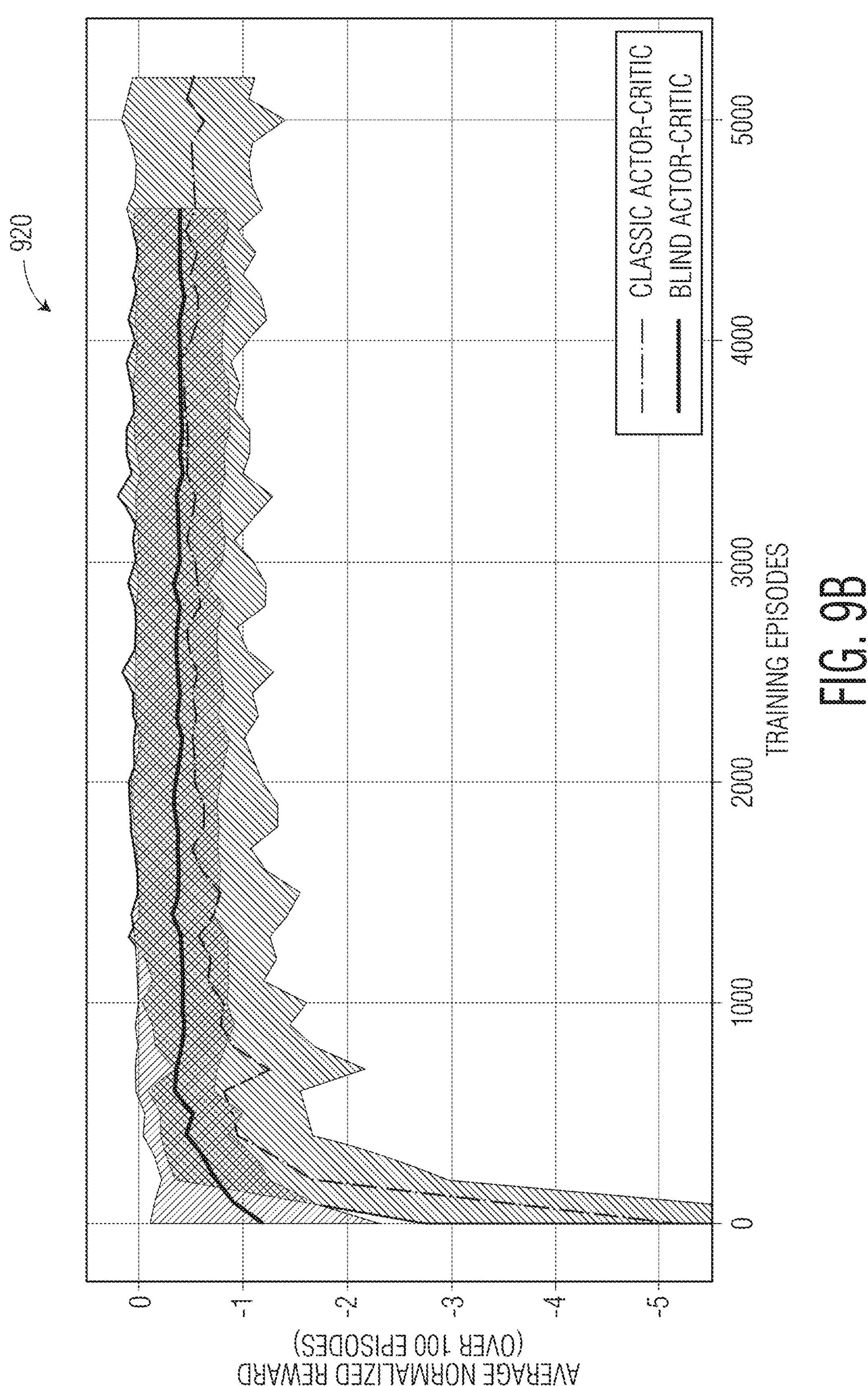
FIG. 9B shows a data plot of average normalized reward, according to an example embodiment of the present disclosure.

FIG. 9B shows a data plot 920 of average normalized reward with respect to the number of training episodes. As shown, over thousands of training episodes, the Blind Actor-Critic algorithm achieves greater normalized rewards than does the classic actor-critic algorithm, especially for lower values of training episodes. In other words, the Blind Actor-Critic algorithm achieves high performance early in the learning process. It is noted that the average is performed per 100 episodes in FIG. 9B. Also, the average normalized reward of the Blind Actor-Critic algorithm has lower variance than the average normalized reward of the classic actor-critic, which means that the performance of the Blind Actor-Critic is more stable than the classic actor-critic The residual variance of the value function was evaluated for the Blind Actor-Critic and compared with that of the classic actor-critic, under varying V2X communication conditions (delays and data loss). The results are presented in FIG. 9A. When performing training with V2X network data ($\mu_{delay}$=50 ms, $P_{MLR}$=0.7), the Blind Actor-Critic with V2X network reaches lower residual variance values at the end of training compared to the classic algorithm with V2X network. To confirm these results, the severity of impaired observability was increased by generating uniformly random intervals ($\delta t_i$) in the range of [0 ms, 1200 ms]. From FIG. 9A, the Blind Actor-Critic with random periods keeps lower values of residual variance at the end of training in contrast to the classic approach with random periods whose residual variance increased significantly. For both cases (V2X network data and uniformly random temporal intervals), the average residual variance is smoother when training the Blind Actor-Critic algorithm compared to the classic algorithm where an apparent oscillation occurs around the elbow point of the theoretical curve (around 0%-20% of training episodes in FIG. 9A). According to these results, the blind algorithm preserves the accuracy and reliability of the value function estimation even when trained using delayed and lost data.

The average training reward of the Blind Actor-Critic was evaluated and compared to that of a classic actor-critic, when they are trained using V2X network data ($\mu_{delay}$=50 ms, $P_{MLR}$=0.7). For consistency and fairness, the reward is further normalized by the value of hyper-parameter a. The results are presented in FIG. 9B. As shown in this figure, the Blind Actor-Critic converges faster compared to the classic algorithm. It also achieves higher average reward values early in the training phase (around 0%-20% of training episodes), which confirms the findings about the residual variance of the value function. The average reward of the Blind Actor-Critic shows a smoother curve and a reduction in variance of approximately 22%, as highlighted by the dashed zones in FIG. 9B. This improvement may be attributed to the introduced fictive sampling period t and the reward approximation mechanism.

Figure 9C:
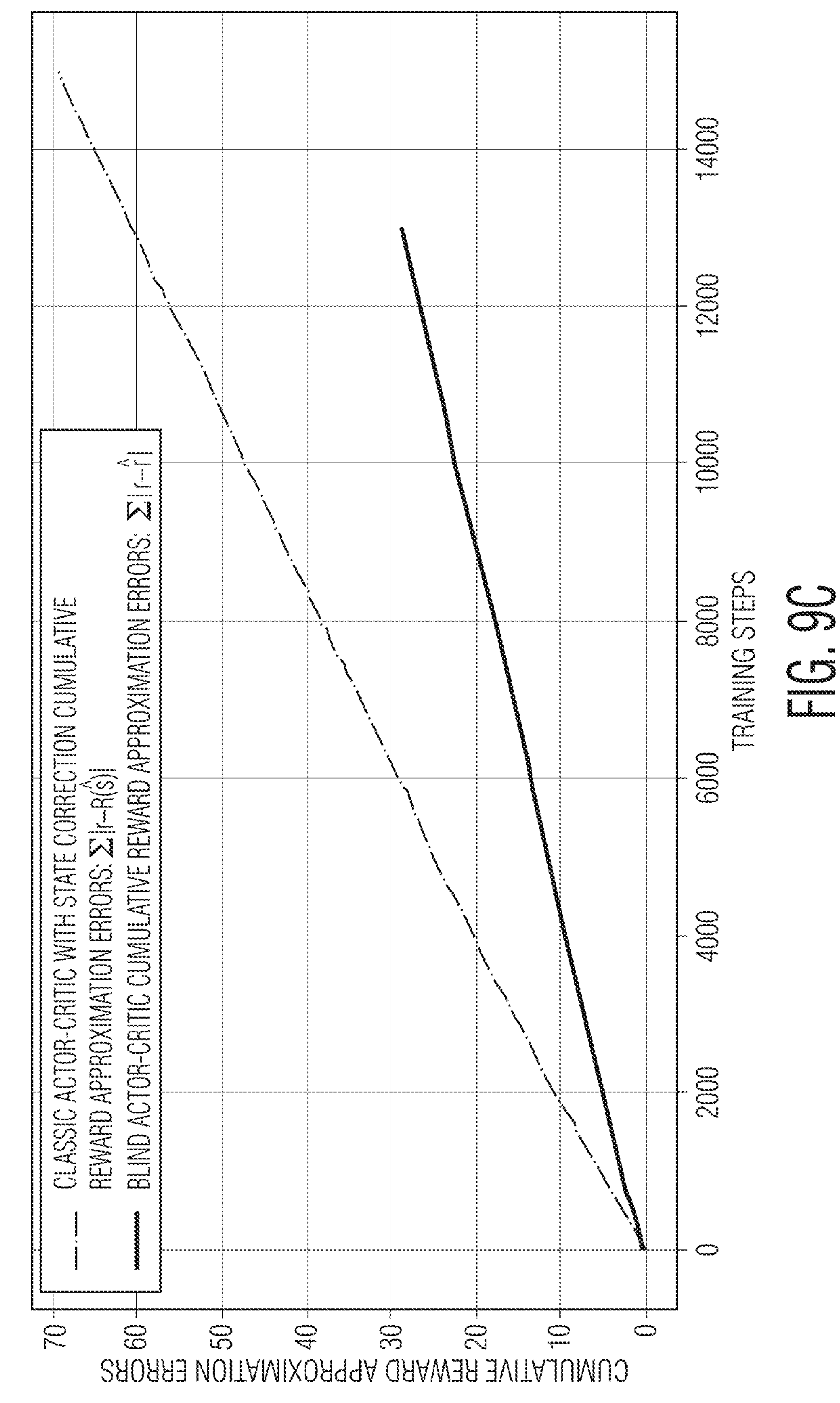
FIG. 9C shows a data plot of cumulative reward approximation errors, according to an example embodiment of the present disclosure.

FIG. 9C shows a data plot 940 of cumulative reward approximation errors with respect to the number of training steps. As shown, over thousands of training steps, the cumulative reward approximation error of the Blind Actor-Critic algorithm is significantly lower than the cumulative reward approximation error of the classic actor-critic algorithm with motion estimator. This shows that the Blind Actor-Critic algorithm approximates rewards more accurately than the classic actor-critic algorithm with motion estimator.

Figure 9D:
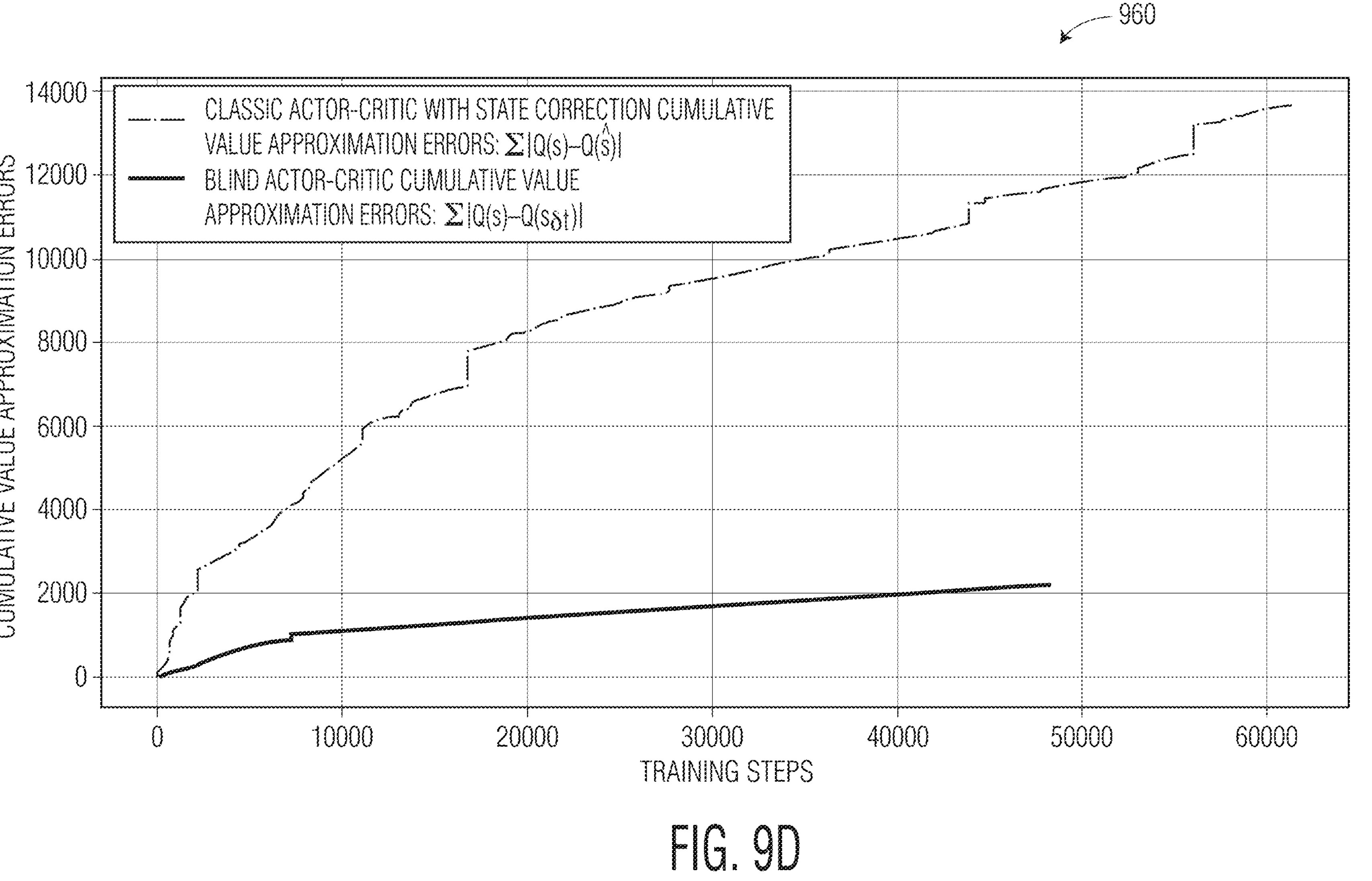
FIG. 9D shows a data plot of cumulative value approximation errors, according to an example embodiment of the present disclosure.

FIG. 9D shows a data plot 960 of cumulative value approximation errors with respect to the number of training steps. As shown, over thousands of training steps, the cumulative value approximation error of the Blind Actor-Critic algorithm is much lower than the cumulative value approximation error of the classic actor-critic algorithm with motion estimator. This shows that the Blind Actor-Critic algorithm approximate the value function more accurately than the classic actor-critic algorithm with motion estimator.

To validate the robustness of the Blind Actor-Critic regarding the unknown and time-varying distortions of the V2X network, its performance was tested for different delays and data loss values and compared it to those of benchmark methods. For consistency and fairness, stringent testing conditions were used, as follows: V2X network reliability is gradually degraded for various values of delays and data loss: $\mu_{delay} \times P_{MLR}$ [10, 30, 50, 70, 90]×[0.1, 0.3, 0.5, 0.7, 0.9].

As mentioned previously, a maximum interval of 1200 ms is assumed to receive at least one V2X data message, even for higher delays and data loss rates, since complete network failure is not considered. For each V2X network reliability level, 10,000 highway on-ramp merging episodes are tested under the simulation framework. This high number of testing episodes allows for a faithful evaluation and comparison of the asymptotic performance of each approach. For each V2X network reliability level, safety (number of collisions and average safety distance) and efficiency (average speed) performance metrics are evaluated over the 10,000 merging episodes.

Five approaches are tested and their performances are compared. These approaches include: Optimal control as a state-of-the-art optimization-based metho; Classic actor-critic trained with full observability; Classic actor-critic trained with V2X network data ($\mu_{delay}$=50 ms, $P_{MLR}$=0.7), i.e., under impaired observability; Classic actor-critic with state estimation (i.e., missing observations of the environment are estimated using an approximate motion model of vehicles), trained with V2X network data ($\mu_{delay}$=50 ms, $P_{MLR}$=0.7); and Blind Actor-Critic trained with V2X network data ($\mu_{delay}$=50 ms, $P_{MLR}$=0.7).

The performance metrics of each tested approach are summarized in Table V. Results show that the Blind Actor-Critic guarantees a higher safety distance compared to the other approaches. It also prevents collisions and emergency braking even at lower V2X network reliability levels. Regarding traffic efficiency, the average speed of merging is slightly higher when using the Blind Actor-Critic, indicating that traffic flow is more efficient.

TABLE V

Performance metrics results

| — | Average saftey distance (m) | Number of collisions | Number of emergency brakings by surrounding drivers | Average speed (km/h) |
|---|---|---|---|---|
| Optimal control | 48.1 | 49 | 125 | 102 |
| Actor-critic with full observability | 53.3 | 15 | 23 | 109 |
| Actor-critic with impaired observability | 52.8 | 7 | 7 | 109 |
| Actor-critic with state estimation | 53.2 | 15 | 27 | 113 |
| Blind Actor-Critic | 53.8 | 0 | 0 | 114 |

To further validate the performance of the Blind Actor-Critic in more complex real-world scenarios, with multi-dimensional actions, the solution was applied to a highway overtaking use case. Highway overtaking is particularly challenging because it involves several maneuvers, including car following, lane changing, and acceleration/deceleration control. In this use case, the algorithm is trained to provide both longitudinal (i.e., acceleration and deceleration) and lateral (i.e., lane-changing) control.

The state is defined by the relative distance and speed between the CAV and the preceding vehicle in the right lane ($P_1$), the preceding vehicle in the left lane ($P_2$), and the following vehicle in the left lane ($F_2$). The reward function is defined in Eq. 12:

$$r_{t_i} = \begin{cases} -\alpha \cdot \left(1 - e^{-\frac{|d_{P_1} - d_{opt}|^{0.5}}{6}}\right) & (*) \\ -\frac{\alpha}{4} \cdot \left(e^{-\frac{|d_{P_2}|^{0.5}}{6}} + e^{-\frac{|d_{F_2}|^{0.5}}{6}}\right) + & () \\ -\frac{\alpha}{2} \cdot \left(1 - e^{-\frac{|d_{P_1} + d_{over}|^{0.5}}{6}}\right) & \\ +1 & (*) \\ -1 & (****) \end{cases} \tag{12}$$

The (*) term aims to maintain an optimal following distance, $d_{opt}$, from the preceding vehicle, $P_1$, when CAV is on the right lane. a is a hyper-parameter tuned during training. The (**) term aims to maximize safety distance with both the preceding and following vehicles, $P_2$ and $F_2$ resp., when CAV is on the left lane. Also, this function aims to overtake the preceding vehicle on the right lane, $P_1$, by a distance dover. A gradual slope is applied, during lane change, between the two reward terms (*) and () to maintain the continuity of the reward function (i.e., ensuring C continuity). The (*) term rewards successful completion of overtaking maneuver. The (****) term penalizes collisions or stops. The Blind Actor-Critic is trained to provide both longitudinal and lateral control for overtaking on the highway under impaired observability of V2X information. As used previously, the maximum delay between state updates, $\delta t_{max}$, is set to 1200 ms.

Figure 10A:
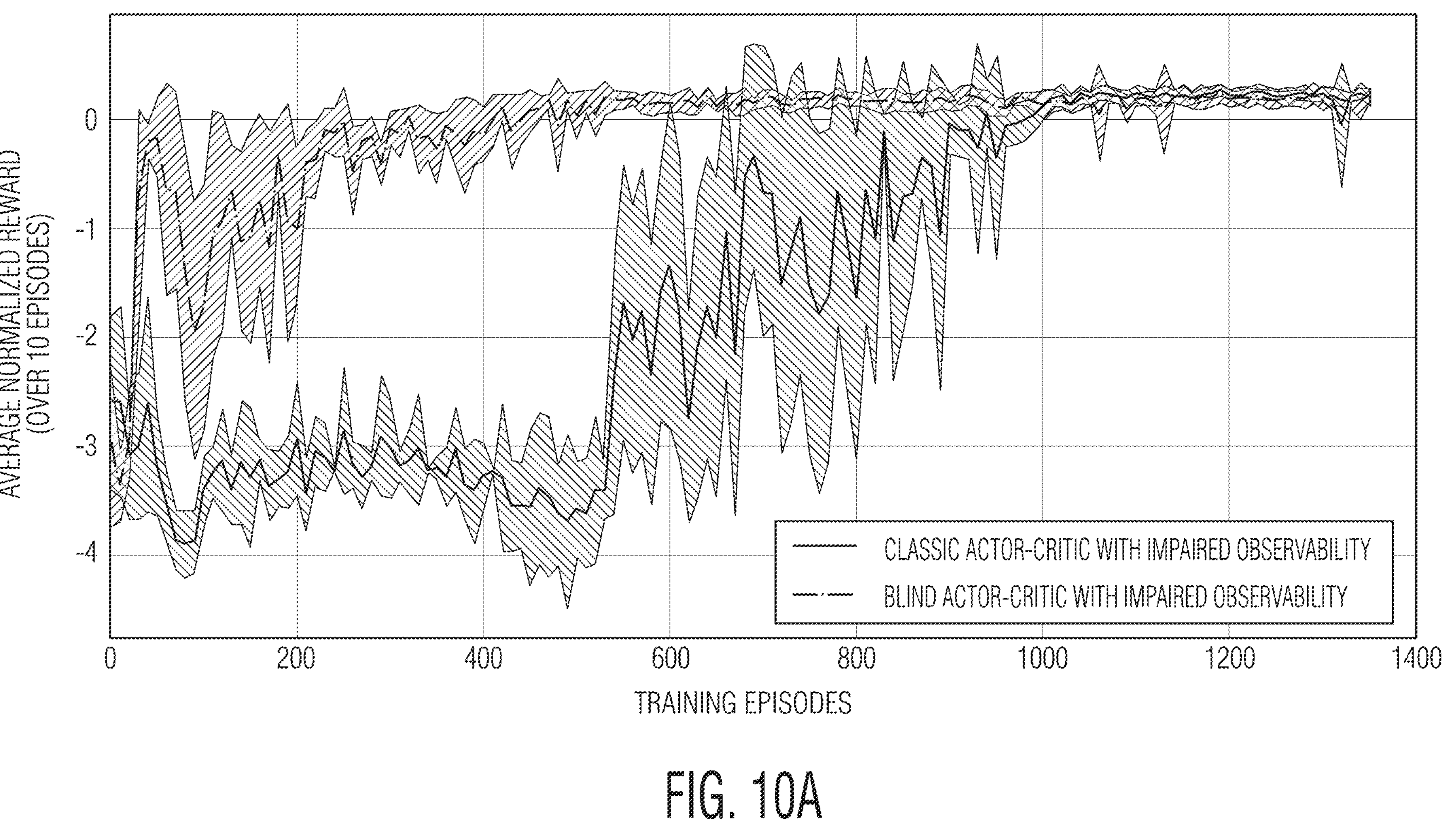
FIG. 10A shows a data plot of average normalized reward over 10 episodes for overtaking scenarios, according to an example embodiment of the present disclosure.

The results are shown in FIG. 10A. Training a classic actor-critic algorithm on this complex use case shows significant difficulty in convergence, with noticeable fluctuations in the average reward toward the end of training. This is due to the complexity of the overtaking maneuver, which requires multiple sequential tasks to be performed successfully. In contrast, the Blind Actor-Critic exhibits stable and faster convergence. The average reward curve remains smooth at the end of training, reflecting the algorithm's robust performance in overcoming the challenges of this complex use case. These results confirm the efficiency and robustness of the proposed approach, even for complex use cases with multidimensional actions.

An ablation study was performed to demonstrate the effectiveness of the design. Particularly, the contributions of two key components were assessed by disabling them individually: The modulated discounted factor, calculated by $$\gamma^{\left(\frac{\delta t_i+1}{\tau}\right)}$$

which adapts the discounting of future rewards based on time delays. In its absence, a constant discount factor γ is used, as in a classic actor-critic. The reward approximation, which is calculated by $$\sum_{k=0}^{\left(\frac{\delta t_{i+1}}{\tau}\right)-1} \gamma^k \cdot \hat{r}_{t_i+k\tau}$$

Instead, a single received reward is used, as in a classic actor-critic.

Figure 10B:
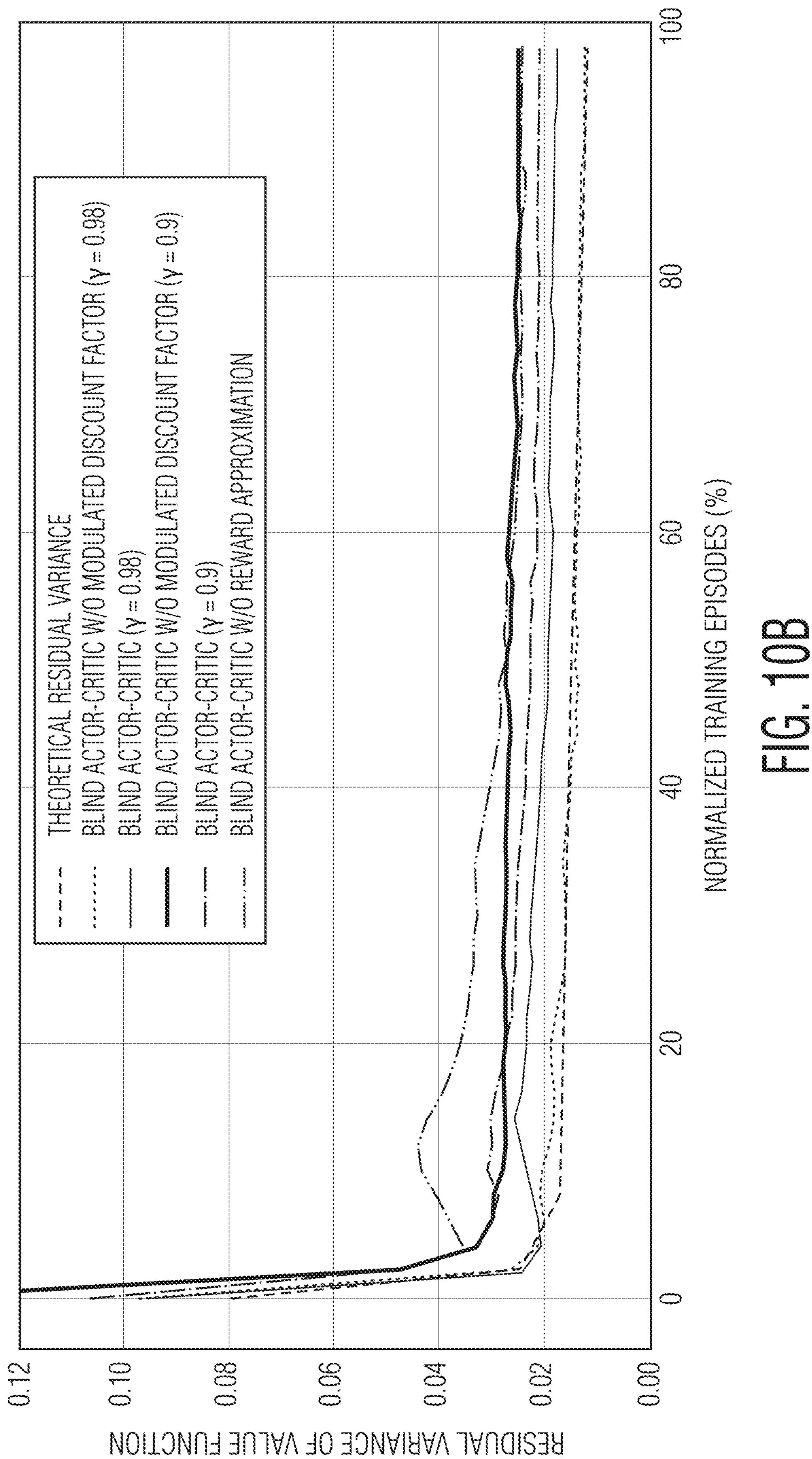
FIG. 10B shows a data plot of an ablation study of average residual variance of the value function during training, according to an example embodiment of the present disclosure.

The impact of these components was evaluated for both training and testing performance. Regarding the average residual variance of the value function, the results of the ablation the results of this ablation analysis in FIG. 10B show that when the Blind Actor-Critic algorithm is trained without a modulated discount factor, the residual variance of the value function becomes lower and smoother. This outcome may be attributed to the fact that a constant discount factor $\gamma=0.98\approx 1$ assigns a higher value compared to the modulated discount factor $$\left(\gamma^{\left(\frac{\delta t_{i+1}}{\tau}\right)}\right),$$

thereby associating greater emphasis on future rewards and the value of the next state during updates of the estimated value function. Consequently, this leads to learning a smoother value function. To further validate this assumption, a smaller discount factor ( )=0.9) was selected to observe its diminished impact on the averaging of future rewards. As a result, the residual variance increased significantly. Regardless of the discount factor's value, the residual variance of the value function for the Blind Actor-Critic remains consistent, further proving the robustness of the approach with respect to the choice of hyper-parameter values. By contrast, training the algorithm without reward approximation yields higher residual variance for the value function.

Figure 10C:
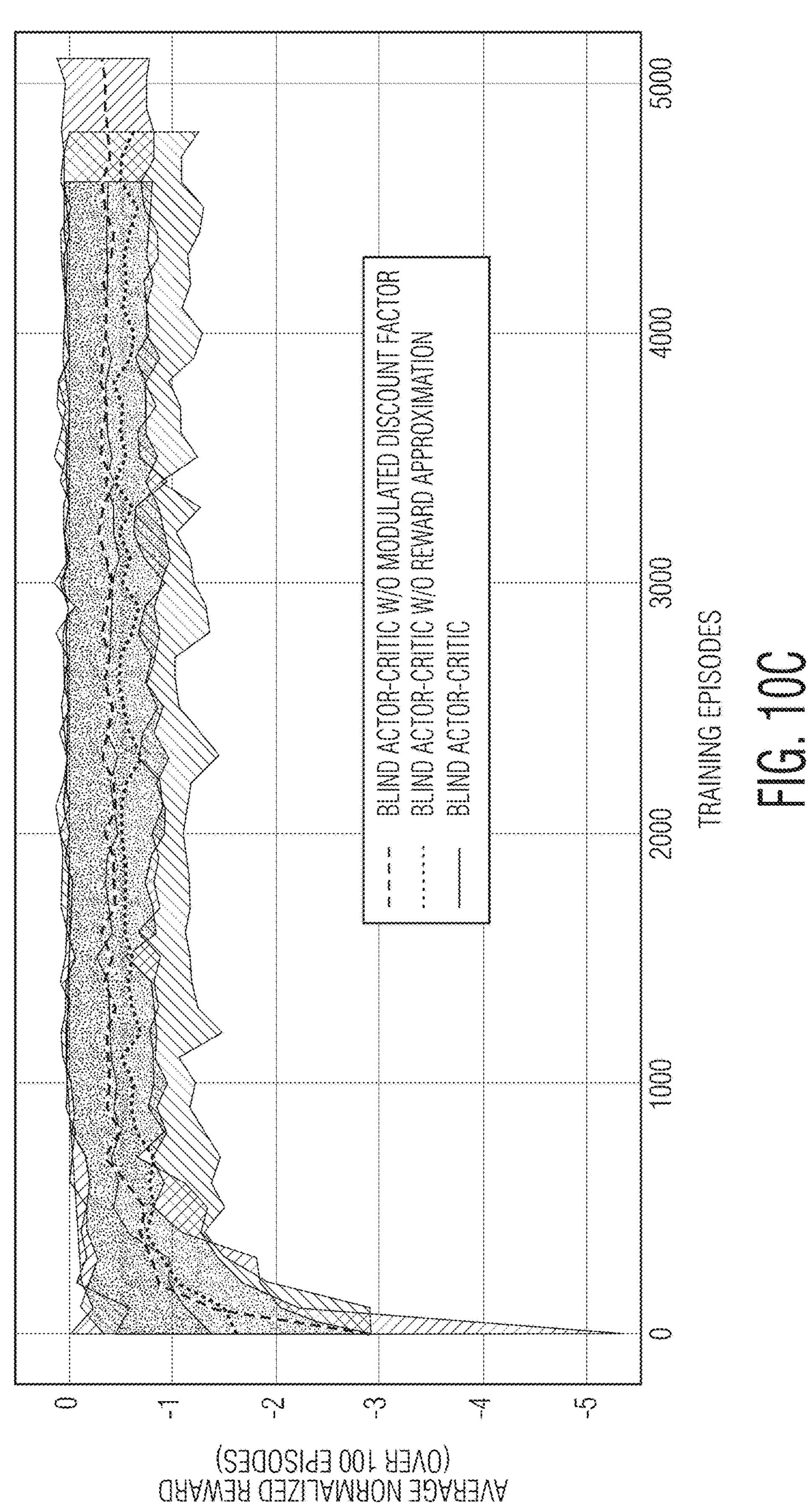
FIG. 10C shows a data plot of an ablation study of average normalized reward over 100 episodes when training with V2X network data, according to an example embodiment of the present disclosure.

The analysis of the average reward in FIG. 10C shows that training the Blind Actor-Critic algorithm without a modulated discount factor results in a slightly less smooth average reward curve. Conversely, training the Blind Actor-Critic without the reward approximation leads to a significantly less smooth average reward curve with higher variance. Indeed, removing the reward approximation has a significant impact on the rewards observed by the algorithm during training.

The impact of this ablation study on the testing performance was also examined, as summarized in Table VI:

TABLE VI

Ablation study: Testing performance

| — | Collisions | Emergency brakings |
|---|---|---|
| Blind Actor-Critic w/o modulated discount factor | 6 | 23 |
| Blind Actor-Critic w/o award approximation | 1 | 4 |
| Blind Actor-Critic | 0 | 0 |

The results have shown that removing either component of the Blind Actor-Critic algorithm (i.e., modulated discount factor or reward approximation) leads to a distortion of performance, as indicated by increased collisions and emergency braking that occur.

Overall, the ablation study shows that both the modulated discount factor and reward approximation are beneficial to the Blind Actor-Critic's architecture, promoting stability and enhanced performance during both training and testing.

While the foregoing is directed to example embodiments described herein, other and further example embodiments may be devised without departing from the basic scope thereof. For example, aspects of the present disclosure may be implemented in hardware or software or a combination of hardware and software. One example embodiment described herein may be implemented as a program product for use with a computer system. The program(s) of the program product defines functions of the example embodiments (including the methods described herein) and may be contained on a variety of computer-readable storage media. Illustrative computer-readable storage media include, but are not limited to: (i) non-writable storage media (e.g., read-only memory (ROM) devices within a computer, such as CD-ROM disks readably by a CD-ROM drive, flash memory, ROM chips, or any type of solid-state non-volatile memory) on which information is permanently stored; and (ii) writable storage media (e.g., floppy disks within a diskette drive or hard-disk drive or any type of solid-state random-access memory) on which alterable information is stored. Such computer-readable storage media, when carrying computer-readable instructions that direct the functions of the disclosed example embodiments, are example embodiments of the present disclosure.

It will be appreciated by those skilled in the art that the preceding examples are exemplary and not limiting. It is intended that all permutations, enhancements, equivalents, and improvements thereto are apparent to those skilled in the art upon a reading of the specification and a study of the drawings are included within the true spirit and scope of the present disclosure. It is therefore intended that the following appended claims include all such modifications, permutations, and equivalents as fall within the true spirit and scope of these teachings.

What is claimed is:

1. A system for autonomously controlling a vehicle, the system comprising:

a receiver configured to receive vehicle-to-everything (V2X) data;

an actuator configured to control an operation of the vehicle; and a processor configured to compensate for impaired observability of the received V2X data by training a reinforcement learning algorithm to update a control policy, the training comprising:

adding a random time delay to the received V2X data to produce time delayed V2X data, extracting features from the time delayed V2X data to produce time delayed extracted features, determining, based on the time delayed extracted features and the control policy, an action for controlling the actuator, controlling the actuator based on the determined action, determining a quality metric based on a change in the extracted features due to controlling the actuator based on the determined action, computing a reward based on the quality metric, and updating the control policy based on the reward.

2. The system of claim 1, wherein the determined action for controlling the actuator compensates for unobserved changes in a state in the extracted features due to the aperiodicity in the timing of the received V2X data.

3. The system of claim 1, wherein the processor is further configured to set statistical parameters of the random time delay according to determined statistical parameters of timing of the received V2X data.

4. The system of claim 1, wherein the V2X data comprises at least one of position, speed and direction of another vehicle, a pedestrian or a structure, a traffic light schedule, a traffic condition or a road condition.

5. The system of claim 1, wherein the actuator is at least one of a steering actuator, braking actuator or acceleration actuator of the vehicle.

6. The system of claim 1, wherein controlling the actuator based on the determined action autonomously controls the vehicle to achieve a driving state relative to a roadway or relative to other vehicles on the roadway.

7. The system of claim 1, wherein the processor is further configured to compare the determined action for controlling the actuator to a safety action, and modify the determined action based on the comparison prior to controlling the actuator.

8. The system of claim 1, wherein the processor is further configured to extract the features from the received V2X data to produce the extracted features as the V2X data is aperiodically received.

9. The system of claim 1, wherein the processor is further configured to perform a combination of Monte Carlo learning and temporal difference learning to compensate for the impaired observability of the received V2X data, wherein during the Monte Carlo learning, the processor approximates the reward.

10. The system of claim 1, wherein the processor is further configured to evaluate performance and model drift of the compensating for impaired observability of the received V2X data and perform tuning of hyperparameters of the reinforcement learning algorithm based on the evaluation.

11. A method for autonomously controlling a vehicle, the method comprising:

receiving, by a receiver, vehicle-to-everything (V2X) data;

controlling, by an actuator, an operation of the vehicle; and compensating, by a processor, for impaired observability of the received V2X data by training a reinforcement learning algorithm to update a control policy, the training comprising:

adding a random time delay to the received V2X data to produce time delayed V2X data, extracting features from the time delayed V2X data to produce time delayed extracted features, determining, based on the time delayed extracted features and the control policy, an action for controlling the actuator, controlling the actuator based on the determined action, determining a quality metric based on a change in the extracted features due to controlling the actuator based on the determined action, computing a reward based on the quality metric, and updating the control policy based on the reward.

12. The method of claim 11, wherein the determined action for controlling the actuator compensates for unobserved changes in a state in the extracted features due to the aperiodicity in the timing of the received V2X data.

13. The method of claim 11, comprising:

setting, by the processor, statistical parameters of the random time delay according to determined statistical parameters of timing of the received V2X data.

14. The method of claim 11, wherein the V2X data comprises at least one of position, speed and direction of another vehicle, a pedestrian or a structure, a traffic light schedule, a traffic condition or a road condition.

15. The method of claim 11, wherein the actuator is at least one of a steering actuator, braking actuator or acceleration actuator of the vehicle.

16. The method of claim 11, comprising:

controlling, by the processor, the actuator based on the determined action autonomously to control the vehicle to achieve a driving state relative to a roadway or relative to other vehicles on the roadway.

17. The method of claim 11, comprising:

comparing, by the processor, the determined action for controlling the actuator to a safety action; and modifying, by the processor, the determined action based on the comparison prior to controlling the actuator.

18. The method of claim 11, comprising:

extracting, by the processor, the features from the received V2X data to produce the extracted features as the V2X data is aperiodically received.

19. The method of claim 11, comprising:

performing, by the processor, a combination of Monte Carlo learning and temporal difference learning to compensate for the impaired observability of the received V2X data, wherein during the Monte Carlo learning, the processor approximates the reward.

20. The method of claim 11, comprising:

evaluating, by the processor, performance and model drift of the compensating for impaired observability of the received V2X data and performing tuning of hyperparameters of the reinforcement learning algorithm based on the evaluating.

* * * * *